US012785840B2

(12) United States Patent
Buset et al.

(10) Patent No.: US 12,785,840 B2
(45) Date of Patent: Nov. 3, 2026

(54) AUTOMATED ASE IDLER MANAGEMENT SYSTEM FOR WSS-BASED SPECTRAL FILLING IN OPTICAL LINE SYSTEMS

(71) Applicant: Infinera Corp., San Jose, CA (US)

(72) Inventors: Jonathan Michael Buset, San Jose, CA (US); Nisar Ahmed, Bellevue, WA (US); Sanjeev Ramachandran, Manipal (IN); Ashok Kunjidhapatham, Karnataka (IN); Thomas Gerard, Campbell, CA (US); Francisco Javier Vaquero Caballero, San Jose, CA (US)

(73) Assignee: Infinera Corp.

( * ) Notice: Subject to any disclaimer, the term of this patent is extended or adjusted under 35 U.S.C. 154(b) by 205 days.

(21) Appl. No.: 18/902,415

(22) Filed: Sep. 30, 2024

(65) Prior Publication Data

US 2025/0112724 A1 Apr. 3, 2025

Related U.S. Application Data

(60) Provisional application No. 63/541,736, filed on Sep. 29, 2023, provisional application No. 63/541,646, filed on Sep. 29, 2023.

(51) Int. Cl.
*H04J 14/02* (2006.01)
*H04B 10/2507* (2013.01)

(52) U.S. Cl.
CPC .... *H04J 14/0221* (2013.01); *H04B 10/25073* (2013.01); *H04J 14/0212* (2013.01); *H04J 14/02126* (2023.08); *H04J 14/0241* (2013.01); *H04J 14/0257* (2013.01)

(58) Field of Classification Search
None
See application file for complete search history.

(56) References Cited

U.S. PATENT DOCUMENTS

| | | | | |
|---|---|---|---|---|
| 10,784,981 | B2 * | 9/2020 | Boertjes | H04B 10/0775 |
| 11,909,515 | B2 * | 2/2024 | Watanabe | H04B 10/077 |
| 12,425,118 | B2 * | 9/2025 | Buset | H04J 14/0221 |

* cited by examiner

*Primary Examiner* — Jai M Lee

(57) ABSTRACT

A network element comprises a light source generating an optical signal having a USP with a USP bandwidth, an ASE source generating ASE noise, a WSS partitioning the ASE noise into a series of ASE passbands comprising a default bandwidth, an allocated start frequency, and an allocated end frequency, a processor and a memory storing instructions to: mark the ASE passband for deactivation or adjustment based on a comparison of spectral slices of the USP and spectral slices of each ASE passband such that for fully overlapping set of spectral slices the respective ASE is marked for deactivation and for partially overlapping sets of spectral slices, the respective ASE is marked for adjustment so long as a minimum slice threshold is met, otherwise the respective ASE is marked for deactivation; deactivate or adjust the ASE passbands based on their respective marking; and ramp the one or more user signal passband.

20 Claims, 8 Drawing Sheets

AUTOMATED ASE IDLER MANAGEMENT SYSTEM FOR WSS-BASED SPECTRAL FILLING IN OPTICAL LINE SYSTEMS

CROSS-REFERENCE TO RELATED APPLICATIONS

This application claims priority to U.S. Provisional Patent Application No. 63/541,646, titled "An Automated ASE Idler management system for WSS-based spectral filling in optical line systems", filed Sep. 29, 2023, and claims priority to U.S. Provisional Patent Application No. 63/541,736, titled "ASE Idler Passband Loading Control (APLC) Algorithm", filed Sep. 29, 2023, the entire contents of each of which are hereby incorporated herein by reference in their entirety.

BACKGROUND

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wavelength division multiplexing to enable high-bandwidth communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation, and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems.

From time to time, the spectrum of the optical signal may not be fully loaded with all channels having data. Modern terrestrial and subsea optical line systems use Filler type amplified spontaneous emission (ASE) passbands (AP-Fs) to fill empty spectral slices in the optical signal, i.e., slices of channels without data.

C+L optical line systems may be susceptible to experiencing optical power transients during loading operations due to the Stimulated Raman Scattering (SRS) effect across the different frequency bands due to the under-filled optical spectra. This can lead to traffic drop on pre-existing services in one frequency band if there is a significant loading change in the other frequency band.

SUMMARY

In C+L-band networks, services in a particular band (i.e., the C-band or the L-band) should be carefully loaded to minimize the effects of optical power changes on pre-existing services in the other band. Additionally, the optical signal may be shaped during transmission due to fiber transmission characteristics and/or non-ideal network elements such as frequency dependent fiber losses, the fiber attenuation profile, amplifier gain ripple, WDM filter ripple, and/or stimulated Raman scattering SRS, and the like, for example.

Traditional methods of managing Filler type ASE Passbands (AP-Fs) include a 'fixed grid' approach, in which AP-Fs maintain their default width and position until the spectral slices are requested by a User Signal Passband (USP), at which point the AP-F is closed. This approach, however, leads to provisioning blocking and spectral gaps within the optical band resulting in spectral inefficiencies, particularly if the gaps are too small for a new AP-F to fill.

Another traditional approach is to define arbitrarily sized passbands that extend the width of any unoccupied spectrum between USPs. This method is operationally simple and has low complexity when few USPs are present. However, existing Wavelength Selective Switch (WSS) firmware limitations prevent a single large passband from being split into two non-contiguous parts. Consequently, if a USP requests slices in the middle of a larger AP-F, the entire AP-F must be deprovisioned even though only a fraction of the slices are needed for the USP. This leads to excess power transients that can degrade the optical signal.

A further disadvantage of this approach is that the system experiences resource creep, where over time the system must manage an increasing number of AP-Fs. For example, a deactivated USP can lead to multiple AP-Fs where the system initially had fewer. Over the lifetime of a link with many loading/unloading operations, this represents a spiraling management complexity.

Thus, a need exists for an automated ASE idler management system that dynamically adjusts Filler type ASE Passbands (AP-Fs) to optimize spectral efficiency and system stability. The automated ASE idler management system overcomes the limitations of traditional fixed-grid approaches and arbitrarily sized passbands by intelligently managing AP-F sizes and positions. The automated ASE idler management system minimizes spectral gaps, reduces unnecessary power transients, and mitigates resource creep that occurs over multiple loading and unloading operations. Additionally, the automated ASE idler management system performs these adjustments without causing significant Stimulated Raman Scattering (SRS)-induced optical instability or risking traffic hits to existing User Signal Payloads (USPs).

In one implementation, the problems of spectral inefficiency, power transients, and resource creep due to ASE idlers in optical networks are solved by the optical system, network elements, and methods disclosed herein.

A network element comprises a light source, an amplified spontaneous emission (ASE) source, a wavelength selective switch, a processor, and a memory. The light source is operable to generate an optical signal having a user signal passband having a USP bandwidth where the one or more user signal passband based on user data. The ASE source is configured to generate ASE noise. The wavelength selective switch is operable to receive the ASE noise and the one or more user signal passband, to partition the ASE noise into a plurality of ASE passbands, each ASE passband comprising a default bandwidth bound by an allocated start frequency and an allocated end frequency, the default bandwidth comprising a second set of the plurality of spectral slices, to apply an optical filter to the plurality of ASE passbands, and to combine the plurality of ASE passbands and one or more user signal passband into an output optical signal. The memory comprises a non-transitory processor-readable medium storing processor-executable instructions. The instructions, when executed by the processor, cause the processor to: cause the light source to generate the one or more user signal passband on the first set of the plurality of spectral slices based on received user data; for each ASE passband of the plurality of ASE passbands: mark the passband for deactivation or adjustment when the ASE passband meets one or more of the following, by comparing the first set of the plurality of spectral slices with the second set of the plurality of spectral slices: mark the ASE passband for deactivation when the second set of the plurality of spectral slices comprises spectral slices entirely contained within the first set; mark the ASE passband for deactivation when the second set of the plurality of spectral slices comprises spectral slices that are partially contained within the first set of the plurality of spectral sliced and the second set of the plurality of spectral slices includes a count of spectral slices less than a minimum slice threshold; mark the ASE passband for deactivation when the second set of the plurality of spectral slices does not include at least one of the allocated start frequency and the allocated end frequency; mark the ASE passband for adjustment when the second set of the plurality of spectral slices comprises spectral slices that are partially contained within the first set, and the second set of the plurality of spectral slices includes a count of spectral slices meets or exceeds a minimum slice threshold; and mark the ASE passband for adjustment when the second set of the plurality of spectral slices comprises spectral slices not contained within the first set of the plurality of spectral slices, and there is no ASE passband disposed between the first set of the plurality of spectral slices and the second set of the plurality of spectral slices; deactivate the ASE passbands marked for deactivation; adjust the bandwidth size of the ASE passbands marked for adjustment; and ramp up the one or more user signal passband on the first set of the plurality of spectral slices.

A network element comprises: an amplified spontaneous emission (ASE) source, a wavelength selective switch, a processor, and a memory. The ASE source is configured to generate ASE noise. The wavelength selective switch (WSS) is operable to receive an optical signal having a plurality of spectral slices and a user signal passband on a first set of the plurality of spectral slices. The user signal passband is based on user data. The WSS is further operable to receive the ASE noise and the user signal passband, to partition the ASE noise into a plurality of ASE passbands, each ASE passband comprising a default bandwidth bound by an allocated start frequency and an allocated end frequency and a current bandwidth having a current start frequency and a current end frequency, the default bandwidth comprising a second set of the plurality of slices, the second set having a default quantity of spectral slices, to apply an optical filter to the plurality of ASE passbands, and to combine the plurality of ASE passbands and the user signal passband into an output optical signal. The memory comprises a non-transitory processor-readable medium storing processor-executable instructions. The instructions, when executed by the processor, cause the processor to: deactivate the user signal passband; responsive to determining if the first set of the plurality of spectral slices includes at least one slice of a particular second set of the plurality of slices associated with a particular ASE passband and has a minimum passband size, load the particular ASE passband onto the first set of the plurality of spectral slices; and responsive to determining that the particular ASE passband includes a first quantity of slices different than the default quantity and an adjacent ASE passband includes a second quantity of slices different than the default quantity, contract the adjacent ASE passband to the default quantity by surrendering one or more spectral slices nearest the particular ASE passband and expand the particular ASE passband to include the one or more surrendered spectral slices.

The method comprises: receiving a request to deactivate a user signal passband occupying a first set of spectral slices; splitting the user signal passband into one or more subpassbands, each subpassband comprising a subset of the first set of spectral slices; and for each subpassband of the one or more subpassbands: deactivating the subpassband; responsive to determining the subset of spectral slices includes a spectral slice associated with a default bandwidth of a particular amplified spontaneous emission (ASE) passband, loading the particular ASE passband onto the subset of spectral slices; and responsive to determining that the particular ASE passband and an adjacent ASE passband have overlapping current bandwidths, adjusting the particular ASE passband and the adjacent ASE passband to restore a boundary frequency between the particular ASE passband and the adjacent ASE passband to one of an allocated start frequency and an allocated end frequency, the boundary frequency being a boundary between the default bandwidth of the particular ASE passband and a default bandwidth of the adjacent ASE passband.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figure 1:
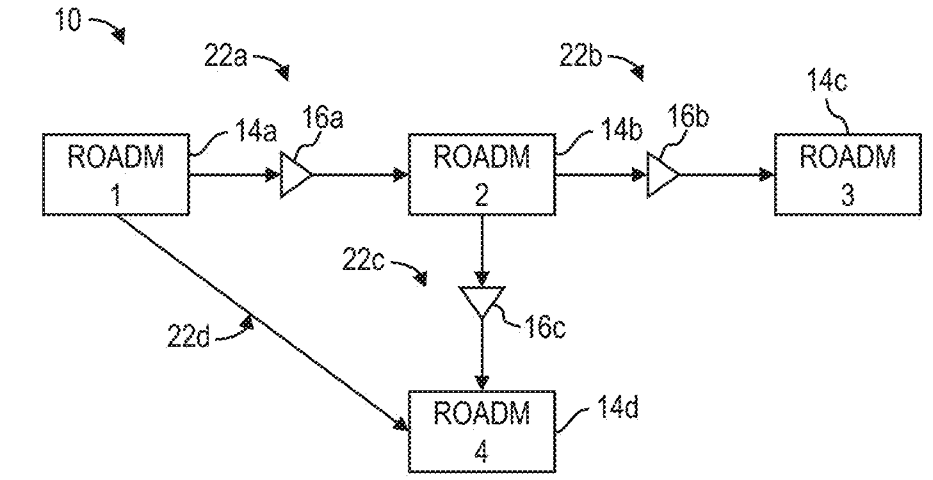
FIG. 1 is a diagram of an exemplary implementation of an optical transport network constructed in accordance with the present disclosure.

The following detailed description of exemplary embodiments/implementations refers to the accompanying drawings. The same reference numbers in different drawings may identify the same or similar elements.

Before explaining at least one implementation of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other implementations or of being practiced or carried out in various ways. Also, it is to be understood that the phraseology and terminology employed herein are for purposes of description and should not be regarded as limiting.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the “a” or “an” are employed to describe elements and components of the embodiments/implementations herein. This is done merely for convenience and to give a general sense of the inventive concept. This description should be read to include one or more and the singular also includes the plural unless it is obvious that it is meant otherwise. Further, use of the term “plurality” is meant to convey “more than one” unless expressly stated to the contrary.

As used herein, qualifiers like “about,” “approximately,” and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term “at least one” or “one or more” will be understood to include one as well as any quantity more than one. In addition, the use of the phrase “at least one of X, Y, and Z” will be understood to include X alone, Y alone, and Z alone, as well as any combination of X, Y, and Z.

The use of ordinal number terminology (i.e., “first”, “second”, “third”, “fourth”, etc.) is solely for the purpose of differentiating between two or more items and, unless explicitly stated otherwise, is not meant to imply any sequence or order or importance to one item over another or any order of addition.

As used herein, any reference to “one embodiment,” “an embodiment,” “some embodiments,” “one implementation,” “some implementations,” “an implementation,” “one example,” “for example,” or “an example” means that a particular element, feature, structure, or characteristic described in connection with the embodiment/implementation/example is included in at least one embodiment/implementation/example and may be used in conjunction with other embodiments/implementations/examples. The appearance of the phrase “in some embodiments” or “one example” or “in some implementations” in various places in the specification does not necessarily all refer to the same embodiment/implementation/example, for example.

Circuitry, as used herein, may be analog and/or digital components referred to herein as “blocks”, or one or more suitably programmed processors (e.g., microprocessors) and associated hardware and software, or hardwired logic. Also, “components” or “blocks” may perform one or more functions. The term “component” or “block” may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory processor-readable mediums, such as a memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHZ, 3.125 GHZ, etc.). For example, a 4.8 terahertz ("THz") frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channel may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A Wavelength Selective Switch is a programmable device having source and destination fiber ports where the source and destination fiber ports and associated attenuation can be specified for a particular passband with a minimum bandwidth. The minimum bandwidth may be, for example, a slice. In one implementation, for example, the wavelength selective switch is operable to apply an attenuation for a particular passband having a first bandwidth and the optical power monitoring device has a resolution of a second bandwidth. The first bandwidth and the second bandwidth may be different (for example, the first bandwidth may be 12.5 GHz and the second bandwidth may be 3.125 GHZ). In this implementation, then, the WSS may have a different slice width than the optical power monitor slice width.

A reconfigurable optical add-drop multiplexer (ROADM) node is an all-optical subsystem that enables remote configuration of wavelengths at any ROADM node, in other words, a ROADM enables optical switching of an optical signal without requiring conversion of the optical signal from an optical domain into an electrical or digital domain. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via usage of a combination of colorless, directionless, and contentionless (CDC) optical devices, which may include wavelength selective switches (WSS), Multicast switches (MCS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

As used herein, a transmission line segment (which may be referred to as an optical link or an optical multiplex section) is the portion of a transmission line from a first node (e.g., a first ROADM) transmitting a transmission signal to a second node (e.g., a second ROADM) receiving the transmission signal. The transmission line segment may include one or more optical in-line amplifier situated between the first node and the second node. In some implementations, an optical multiplex section (OMS) has the same scope as the transmission line segment (TLS). In some implementations, the OMS may be a subset of a TLS. In some implementations, OMS-C(C-Band) and OMS-L (L-Band) are combined together in an optical link or TLS. In some implementations, TLS may be used synonymously with Optical Link. An Optical Link may be composed of OMSs including OMS-C and OMS-L.

Referring now to the drawings, and in particular to FIG. 1, shown therein is a diagram of an exemplary implementation of an optical transport network 10 constructed in accordance with the present disclosure. The optical transport network 10 is depicted as having a plurality of network elements 14*a-n*, including a first network element 14*a*, a second network element 14*b*, a third network element 14*c*, and a fourth network element 14*d*. Though four network elements 14 are shown for the purposes of illustration, it will be understood that the plurality of network elements 14*a-n* may comprise more or fewer network elements 14.

Data transmitted within the optical transport network 10 may be transmitted along optical paths formed by a first transmission line segment 22*a*, a second transmission line segment 22*b*, and a third transmission line segment 22*c*. For instance, data transmitted from the first network element 14*a* to the second network element 14*b* may travel along the optical path formed from the first transmission line segment 22*a*.

In some implementations, more than one optical path may connect any two network elements 14 such that the optical transport network 10 may be considered a mesh network. For example, a fourth transmission line segment 22*d* may connect the first network element 14*a* and the fourth network element 14*d*. In this way, data may be transmitted between the first network element 14*a* and the fourth network element 14*d* via one or more of: the fourth transmission line segment 22*d* and a combination of the first transmission line segment 22*a*, the second network element 14*b*, and the third transmission line segment 22*c*.

The optical transport network 10 may be provided with one or more optical in-line amplifiers (ILA) disposed in the transmission line segments 22*a*, 22*b*, and 22*c* such as a first ILA 16*a*, a second ILA 16*b*, and a third ILA 16*c* disposed in the transmission line segments 22*a*, 22*b*, and 22*c*, respectively.

The optical transport network 10 may be, for example, made up of interconnected individual nodes (that is, the network elements 14). The optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices, and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical transport network 10 may perform one or more functions described as being performed by another one or more of the devices of the optical transport network 10.

Figure 2A:
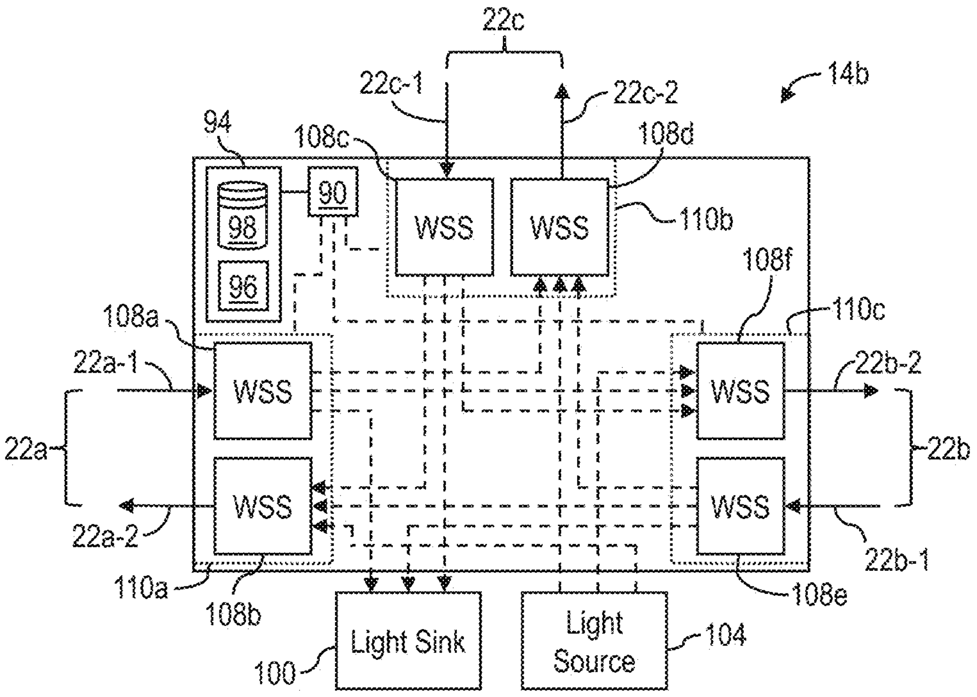
FIG. 2A is a block diagram of an exemplary implementation of the second network element of FIG. 1, constructed in accordance with the present disclosure.

Referring now to FIG. 2A, shown therein is a block diagram of an exemplary implementation of the network element 14*b* constructed in accordance with the present disclosure. In general, the network element 14*b* transmits and receives data traffic and control signals. Nonexclusive examples of alternative implementations of the network element 14*b* include optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links. OLTs may be used at either end of a connection or optical fiber link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety. As used herein, the network element 14 is implemented as a ROADM unless specifically stated otherwise.

For the purposes of illustration, and not limitation, the second network element 14*b* will be described as an exemplary network element 14. It should be understood, however, that each network element 14 may be comprised of the same elements. In FIG. 2A, the second network element 14*b* is illustrated as being a ROADM having three degrees that interconnect the first transmission line segment 22*a*, the second transmission line segment 22*b*, and the third transmission line segment 22*c*. Each of the first transmission line segment 22*a*, the second transmission line segment 22*b*, and the third transmission line segment 22*c* may include optical fiber pairs, wherein each fiber of the pair carries optical signal groups propagating in opposite directions. As seen in FIG. 2A, for example, the first transmission line segment 22*a* includes a first optical fiber 22*a*-1, which carries optical signals toward the second network element 14*b* and a second optical fiber 22*a*-2 that carries optical signals out from the second network element 14*b*. Similarly, the second transmission line segment 22*b* may include a first optical fiber 22*b*-1 and a second optical fiber 22*b*-2 carrying optical signal groups to and from the second network element 14*b*, respectively. Further, the third transmission line segment 22*c* may include first optical fiber 22*c*-1 and second optical fiber 22*c*-2 also carrying optical signals to and from the second network element 14*b*, respectively. Additional nodes, not shown in FIG. 2A, may be provided that supply optical signal groups to and receive optical signal groups from the second network element 14*b*. Such nodes may also have a ROADM having the same or similar structure as that of the second network element 14*b*.

As further shown in FIG. 2A, a light sink 100 (described below in more detail and shown in FIG. 2B) and a light source 104 (described below in more detail and shown in FIG. 2C) may be provided in communication with the second network element 14*b* to drop and add optical signal groups, respectively.

As shown in FIG. 2A, the second network element 14*b* may include a plurality of wavelength selective switches (WSSs 108), such as a first wavelength selective switch 108*a*, a second wavelength selective switch 108*b*, a third wavelength selective switch 108*c*, a fourth wavelength selective switch 108*d*, a fifth wavelength selective switch 108*e*, and a sixth wavelength selective switch 108*f*. Wavelength selective switches are components that can dynamically route, block, and/or attenuate received optical signal groups input from and output to transmission line segments 22*a-n*. In addition to transmitting/receiving optical signal groups from network elements 14, optical signal groups may also be input from or output to the light source 104 and light sink 100, respectively. Each WSS 108 may have a minimum slice bandwidth such that the minimum WSS slice bandwidth is at least 12.5 GHZ, 6.25 GHZ, or 3.125 GHZ, for example. In one implementation, the processor 90 may store system parameters, such as the minimum slice bandwidth, in the memory 94. The minimum WSS slice bandwidth may be, for example, a minimum supported passband.

In one embodiment, the WSSs 108 for a particular degree, along with associated ROADM memory 188 and ROADM processor 186 (shown in FIG. 2D), may be collectively referred to as a flexible ROADM module, or ROADM 110. For example, as shown in FIG. 2A, a first WSS 108*a* and a second WSS 108*b* may be part of a first ROADM 110*a*, a third WSS 108*c* and a fourth WSS 108*d* may be part of a second ROADM 110*b*, and a fifth WSS 108*e* and a sixth WSS 108*f* may be part of a third ROADM 110*c*.

In one embodiment, each WSS 108*a-f* may include a reconfigurable optical filter (not shown) operable to allow a passband (e.g., particular bandwidth of the spectrum of the optical signal) to pass through or be directly routed as herein described.

As further shown in FIG. 2A, each WSS 108*a-f* may be configured to receive optical signal groups (e.g., optical passbands) and may be operable to selectively switch, or direct, such optical signal groups to other WSSs for output from the second network element 14*b*. For example, the first WSS 108*a* may receive optical signal groups on the first optical fiber 22*a*-1 and supply certain optical signal groups to the sixth WSS 108*f*, while other optical signal groups are supplied to a fourth WSS 108*d*. Optical signal groups supplied to the sixth WSS 108*f* may be output to a downstream network element 14, such as the third network element 14*c* (FIG. 1) on the second optical fiber 22*b*-2, while optical signal groups supplied to the fourth WSS 108*d* may be output to the fourth network element 14*d* on second optical fiber 22*c*-2. Optical signal groups input to the second network element 14*b* on the first optical fiber 22*b*-1 may be supplied by the fifth WSS 108*e* to either the second WSS 108*b* and on to the first network element 14*a* via the second optical fiber 22*a*-2 or the fourth WSS 108*d* and on to the fourth network element 14*d* via the second optical fiber 22*c*-2. Moreover, the third WSS 108*c* may selectively direct optical signal groups (e.g., selectively switch optical passband groups) input to the second network element 14*b* from the first optical fiber 22*c*-1 to either the second WSS 108*b* and onto the first network element 14*a* via the second optical fiber 22*a*-2 or to the sixth WSS 108*f* and onto the second network element 14*b* via the second optical fiber 22*b*-2.

The first WSS 108*a*, third WSS 108*c*, and fifth WSS 108*e* may also selectively or controllably supply optical signal groups to the light sink 100. Optical signal groups output from the light source 104 may be selectively supplied to one or more of the second WSS 108*b*, fourth WSS 108*d*, and sixth WSS 108*f*, for output on to the second optical fiber 22*a*-2, second optical fiber 22*b*-2, and second optical fiber 22*c*-2, respectively.

In one implementation, the second network element 14*b* may further comprise a node processor 90 and a non-transitory processor-readable medium referred to herein as node memory 94. The node processor 90 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The node processor 90 is in communication with the node memory 94 and may be operable to read and/or write to the node memory 94. The node processor 90 is illustrated in communication with the first ROADM 110*a*, the second ROADM 110*b*, and the third ROADM 110*c*, however, it should be noted that in some implementations, the node processor 90 may be in communication with each WSS 108. The node processor 90 may be further capable of interfacing and/or communicating with other network elements 14 (e.g., the first network element 14*a*, the third network element 14*c*, and the fourth network element 14*d*) via, for example, an optical control channel (e.g., sometimes referred to herein as an optical supervisory channel or an "OSC").

In one implementation, the node memory 94 of the network element 14, such as of the second network element 14*b*, may store processor-executable instructions, such as a software 96, that when executed by the node processor 90, causes the node processor 90 to perform an action, for example, communicate with or control one or more component of the network element 14 such as control one or more of the WSS 108 and the ROADM 110.

In one implementation, the node memory 94 may store one or more of the datastore 98. The datastore 98 may include, for example, structured data from relational databases, semi-structured data, unstructured data, time-series data, binary data, and the like and/or some combination thereof. The datastore 98 may be a data base, a remote accessible storage, or a distributed filesystem. In some embodiments, the datastore 98 may be a component of an enterprise network.

Figure 2B:
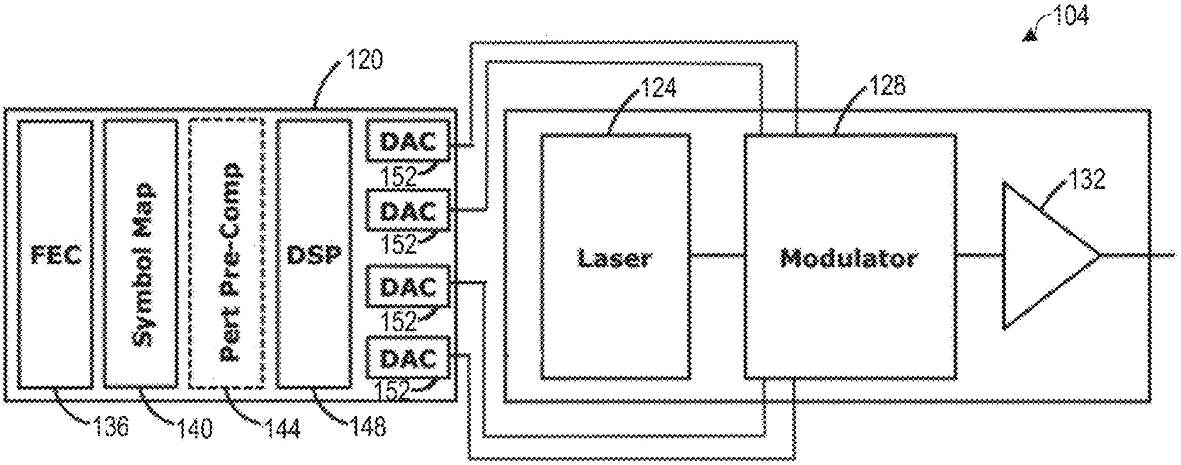
FIG. 2B is a diagram of an exemplary implementation of the light source of FIG. 2A constructed in accordance with the present disclosure.

Referring now to FIG. 2B, shown therein is a diagram of an exemplary implementation of the light source 104 of FIG. 2A constructed in accordance with the present disclosure. The light source 104 may comprise one or more transmitter processor circuit 120, one or more laser 124, one or more modulator 128, one or more semiconductor optical amplifier 132, and/or other components (not shown).

The transmitter processor circuit 120 may have a Transmitter Forward Error Correction (FEC) circuitry 136, a Symbol Map circuitry 140, a transmitter perturbative pre-compensation circuitry 144, one or more transmitter digital signal processor (DSP) 148, and one or more digital-to-analogue converters (DAC) 152. The transmitter processor circuit 120 may be located in any one or more components of the light source 104, or separate from the components, and/or in any location(s) among the components. The transmitter processor circuit 120 may be in the form of one or more Application Specific Integrated Circuit (ASIC), which may contain one or more module and/or custom module.

Processed electrical outputs from the transmitter processor circuit 120 may be supplied to the modulator 128 for encoding data into optical signals generated and supplied to the modulator 128 from the laser 124. The semiconductor optical amplifier 132 receives, amplifies, and transmits the optical signal including encoded data in the spectrum. Processed electrical outputs from the transmitter processor circuit 120 may be supplied to other circuitry in the transmitter processor circuit 120, for example, clock and data modification circuitry. The laser 124, modulator 128, and/or semiconductor optical amplifier 132 may be coupled with a tuning element (e.g., a heater) (not shown) that can be used to tune the wavelength of an optical signal channel output by the laser 124, modulator 128, or semiconductor optical amplifier 132. In some implementations, a single one of the laser 124 may be shared by multiple light source 104.

Other possible components in the light source 104 may include filters, circuit blocks, memory, such as non-transitory memory storing processor-executable instructions, additional modulators, splitters, couplers, multiplexers, etc., as is well known in the art. The components may be combined, used, or not used, in multiple combinations or orders. Optical transmitters are further described in U.S. Pat. No. 8,768,177, titled "WAVELENGTH DIVISION MULTIPLEXED OPTICAL COMMUNICATION SYSTEM HAVING VARIABLE CHANNEL SPACINGS", the entire content of which is hereby incorporated by reference in its entirety herein.

Figure 2C:
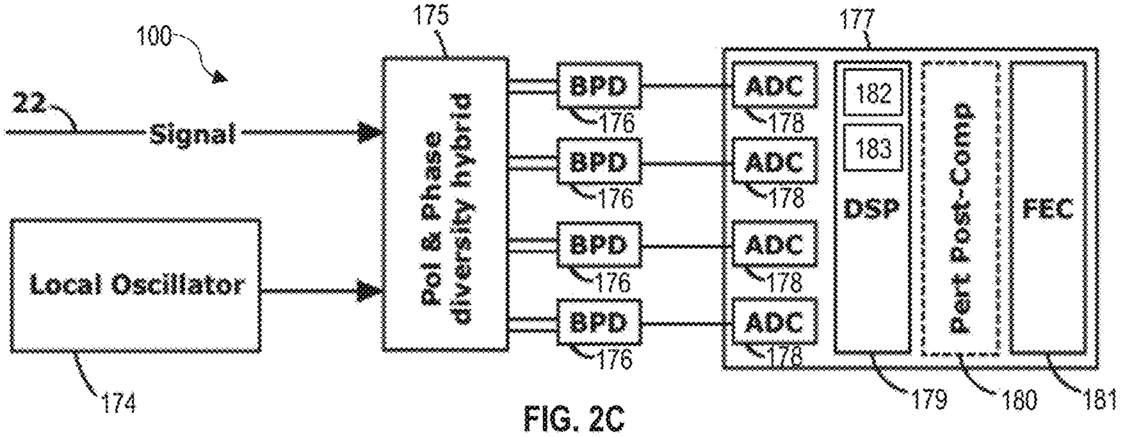
FIG. 2C is a block diagram of an exemplary implementation of the light sink of FIG. 2A constructed in accordance with the present disclosure.

Referring now to FIG. 2C, shown therein is a block diagram of an exemplary implementation of the light sink 100 constructed in accordance with the present disclosure. The light sink 100 may comprise one or more local oscillator 174, a polarization and phase diversity hybrid circuit 175 receiving the one or more channel from the optical signal and the input from the local oscillator 174, one or more balanced photodiode (BPD) 176 that produces electrical signals representative of the one or more channel on the spectrum, and one or more receiver processor circuit 177. Other possible components in the light sink 100 may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The light sink 100 may be implemented in other ways, as is well known in the art. Exemplary implementations of the light sink 100 are further described in U.S. Pat. No. 8,014,686, titled "POLARIZATION DEMULTIPLEXING OPTICAL RECEIVER USING POLARIZATION OVERSAMPLING AND ELECTRONIC POLARIZATION TRACKING", the entire content of which is hereby incorporated by reference in its entirety herein.

The one or more receiver processor circuit 177, may comprise one or more analog-to-digital converter (ADC) 178 receiving electrical signals from the one or more balanced photodiodes 176, one or more receiver digital signal processor (hereinafter, receiver DSP 179), receiver perturbative post-compensation circuitry 180, and receiver forward error correction circuitry (hereinafter, receiver FEC circuitry 181). The receiver FEC circuitry 181 may apply corrections to the data, as is known in the art. The one or more receiver processor circuit 177 and/or the one or more receiver DSP 179 may be located on one or more component of the light sink 100 or separately from the components, and/or in any location(s) among the components. The receiver processor circuit 177 may be in the form of an Application Specific Integrated Circuit (ASIC), which may contain one or more module and/or custom module. In one embodiment, the receiver DSP 179 may include, or be in communication with, one or more processor 182 and one or more memory 183 storing processor readable instructions, such as software, or may be in communication with the node processor 90 and the node memory 94.

The one or more receiver DSP 179 may receive and process the electrical signals with multi-input-multiple-output (MIMO) circuitry, as described, for example, in U.S. Pat. No. 8,014,686, titled "Polarization demultiplexing optical receiver using polarization oversampling and electronic polarization tracking", the entire contents of which are hereby incorporated by reference herein. Processed electrical outputs from receiver DSP 179 may be supplied to other circuitry in the receiver processor circuit 177, such as the receiver perturbative post-compensation circuitry 180 and the receiver FEC circuitry 181.

Various components of the light sink 100 may be provided or integrated, in one example, on a common substrate. Further integration is achieved by incorporating various optical demultiplexer designs that are relatively compact and conserve space on the surface of the substrate.

In use, the one or more channel of the spectrum may be subjected to optical nonlinear effects between the light source 104 and the light sink 100 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 171 and the receiver perturbative post-compensation circuitry 180. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler", herein incorporated by reference in its entirety, by use of analysis of one or more incoming channel at the light sink 100.

Figure 2D:
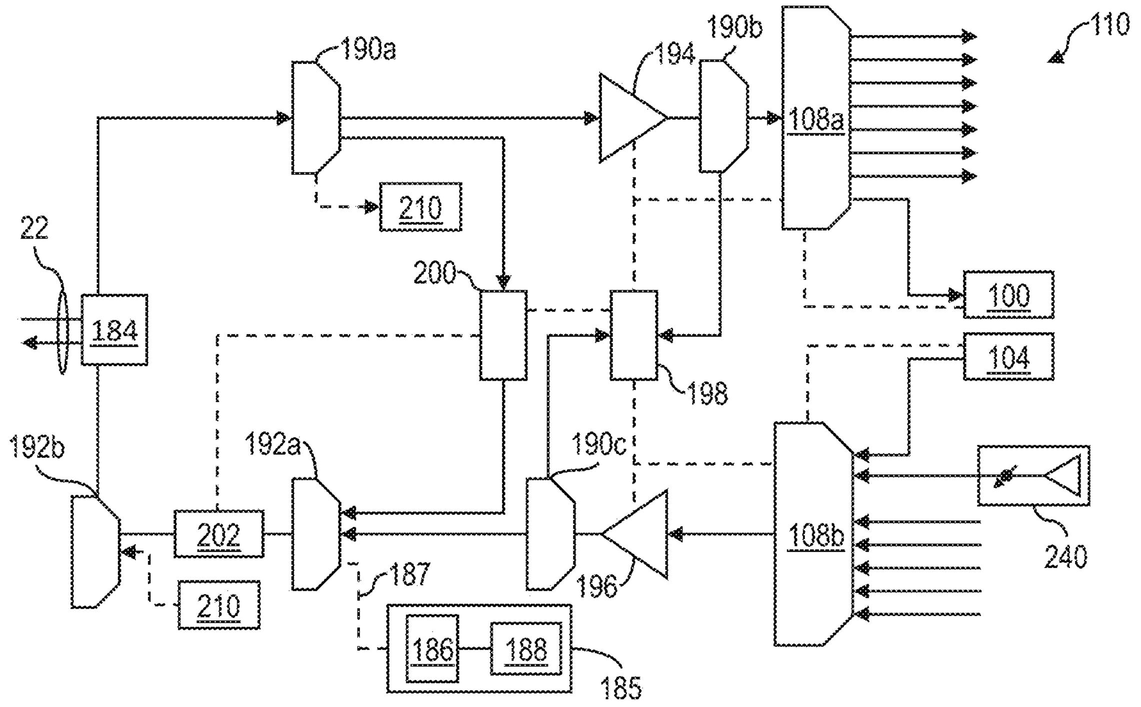
FIG. 2D is a diagrammatic view of an exemplary one of the ROADM of FIG. 2A constructed in accordance with the present disclosure.

Referring now to FIG. 2D, shown therein is a diagrammatic view of an exemplary one of the ROADM 110 constructed in accordance with the present disclosure. In general, the ROADM 110 transmits and receives data traffic and control signals. As shown in FIG. 2D, the ROADM 110 is a flexible ROADM module that connects to the transmission line segment 22 via a line port 184. As detailed above, the transmission line segment 22 may include optical fiber pairs, wherein each fiber of the pair carries optical signal groups propagating in opposite directions. For the purposes of illustration, and not limitation, the ROADM 110 will be described as an exemplary ROADM 110. It should be understood, however, that of the first ROADM 110*a*, second ROADM 110*b*, and third ROADM 110*c* may be constructed in accordance with the ROADM 110 describe herein and may be comprised of the same elements.

In one implementation, the ROADM 110 may be provided with a controller 185 having circuitry including a ROADM processor 186 and a ROADM memory 188. The ROADM memory 188 may be a non-transitory processor-readable medium storing processor-executable instructions that when executed by the ROADM processor 186 cause the ROADM processor 186 to perform one or more function or process, as described below.

In one implementation, the ROADM 110 may further be provided with an input optical splitter 190, an output optical combiner 192, an input optical amplifier 194, an output optical amplifier 196, the first WSS 108*a*, the second WSS 108*b*, a spectrally-resolved measurement device 198, and an optical supervisory channel (OSC) 200. In one implementation, at least one light sink 100 and at least one light source 104 may be provided and in communication with the ROADM 110 to drop and add optical signals, respectively.

It should be noted that the elements of the ROADM 110 are shown for illustration purposes only and should not be considered limiting. The ROADM 110 may be implemented with a launch power for each transmission line segment 22 serviced by the controller 185 of the ROADM 110 implemented in accordance with the inventive concepts described herein. Further, the light source 104 and the light sink 100 may be implemented as a line card having multiple add and drop transceivers and may be configured to service channels across multiple ROADM degrees.

The spectrally-resolved measurement device 198 provides the ability to monitor a power level at one or more sample frequency of the optical signal with a sample resolution. The sample resolution may be, for example, between 12.5 GHZ and 0.3125 GHz. In other implementations, the sample resolution may be less than 0.3125 GHZ, for example, 0.15625 GHz or 78.125 MHz. For example, if the spectrally-resolved measurement device 198 has a sample resolution of 12.5 GHz and the optical signal has a signal bandwidth of 125 GHZ, the spectrally-resolved measurement device 198 may slice the signal bandwidth into 10 spectral slices of 12.5 GHz where each spectral slice is centered on a particular sample frequency. The spectrally-resolved measurement device 198 may thus determine the power level of each spectral slice for the optical signal based on the sample frequency for each spectral slice.

In one implementation, as the spectrally-resolved measurement device 198 determines a power level for a particular sample frequency, the power level/sample frequency pair is stored, for example, in the ROADM memory 188 by the ROADM processor 186. In one implementation, the spectrally-resolved measurement device 198 may measure one or more optical characteristics of an optical signal, such as, for example, a power spectral density, a center frequency, an optical bandwidth, a shape, a channel slope, a channel roll-off, and/or the like or some combination thereof. In this way, the spectrally-resolved measurement device 198 is operable to sample an optical power of one or more spectral slice. The spectrally-resolved measurement device 198 can be implemented as an optical power monitor, the construction and use of which is known in the art.

This slice-wise power level data can then be used by the controller 185, e.g., processed by the ROADM processor 186 of the controller 185, to determine a sample power profile of the optical signal. The sample power profile, then, may be a set of sample frequency/power level pairs for each spectral slice. In one implementation, the sample power profile may be a power profile of a particular passband comprising spectral slices of the optical signal.

In one implementation, the ROADM processor 186 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The ROADM processor 186 is in communication with the ROADM memory 188 and may be operable to read and/or write to the ROADM memory 188.

In one implementation, the spectrally-resolved measurement device 198 can also be used to troubleshoot the optical transport network 10, such as optical channel monitors (OCMs) and higher-resolution coherent OCMs. Coherent OCMs offer sub-GHz frequency accuracy and highly accurate power monitoring of fine spectral slices independent of adjacent channel power. Coherent OCMs reduce the C-band scanning time from seconds to hundreds of milliseconds and provide advanced processing of spectral characteristics, such as valid channel detection, center wavelength, and optical signal-to-noise ratio (OSNR).

In one implementation, the OSC 200 provides a communication channel between adjacent nodes, such as the first network element 14*a* and the second network element 14*b*, that can be used for functions including link control, in-band management, control plane (i.e., ASON/GMPLS), and span loss measurement. Static information about physical properties of the transmission line segment 22 (fiber types, loss, amplifier types, etc.) downstream from the network element 14 can be communicated to the controller 185 via the OSC 200.

As shown in FIG. 2D, the ROADM 110 may include the controller 185 for controlling components of the ROADM 110. The ROADM 110 may be provided with an interface 187 that connects the controller 185 to the components of the ROADM 110.

The ROADM 110 may include one or more wavelength selective switch, shown as the second WSS 108*b* (as a mux WSS) and the first WSS 108*a* (as a demux WSS). As described above, wavelength selective switches are components that can dynamically route, block and/or attenuate received optical signals input from and output to optical fiber links 22*a-n*. In addition to transmitting and/or receiving optical signals from the ROADM 110, optical signals may also be input from or output to the light source 104 or an amplified spontaneous emission (ASE) idler, e.g., ASE idler 240, and the light sink 100, respectively.

In one implementation, each WSS 108 may be a reconfigurable, optical filter operable to allow one or more passbands (e.g., particular bandwidth(s) of the spectrum of the optical signal) to pass through or be routed as herein described.

In one implementation, the first WSS 108*a* may be a DEMUX WSS, e.g., can receive optical signals and may be operable to selectively switch, or direct, such optical signals to one or more other WSS for output from the ROADM 110. The first WSS 108*a* (e.g., a demux WSS) may also selectively or controllably supply optical signals to the light sink 100. The second WSS 108*b* may be a MUX WSS, e.g., operable to selectively receive optical signals from the light source 104 and from one or more express path. The optical signals output from the light source 104, the ASE idler 240, and/or from the express path may be selectively supplied to the second WSS 108*b* for output to the first transmission line segment 22*a*.

In one implementation, the second WSS 108*b* may attenuate and apply an optical filter to ASE noise received from the ASE idler 240 into an ASE passband before multiplexing the ASE passband onto the optical signal.

In one implementation, the input optical amplifier 194 and/or the output optical amplifier 196 may be any optical amplifier configured to increase or supplement an optical power of the optical signal. For example, one or more of the input optical amplifier 194 and the output optical amplifier 196 may be an Erbium doped fiber amplifier (EDFA). In one implementation, one or more of the input optical amplifier 194 and the output optical amplifier 196 may further include a variable optical attenuator.

In one implementation, the ROADM 110 further includes an output variable optical attenuator 202 (e.g., VOA 202). The VOA 202 is an optical device operable to control attenuation (or insertion loss) according to an electrical control signal (e.g., received from the ROADM processor 186 of the controller 185 (described below)). The insertion loss may be, for example, a calibrated known value.

As shown in FIG. 2D, a first optical signal enters the ROADM 110 via the first transmission line segment 22*a* and passes through the first optical splitter 190*a* where a control channel may be directed to the OSC 200 and the first optical signal enters the input optical amplifier 194 before being split at a second input optical splitter 190*b* where a sample portion of the first optical signal is directed to the spectrally-resolved measurement device 198 while a remainder of the first optical signal continues to the first WSS 108*a* (e.g., a demux WSS). Further, a plurality of optical signals and ASE noise may be received by the second WSS 108*b* which outputs a third optical signal which is amplified by the output optical amplifier 196 before passing through a third optical splitter 190*c* where a sample portion of the third optical signal is directed to the spectrally-resolved measurement device 198 while a remainder of the third optical signal continues to the output optical combiner 192*a* which inserts a downstream control signal from the OSC 200 into the third optical signal. The third optical signal continues through the VOA 202, to the line port 184 and the first transmission line segment 22*a*

In some implementations, when the ROADM 110 is a C-band ROADM, when the first optical signal enters the first optical splitter 190*a*, the first optical signal is split into a C-band portion that continues within the ROADM 110, and an L-band portion that is directed to an L-band ROADM 210. The L-band ROADM 210 may be constructed similar to the ROADM 110 with the exception that the L-band ROADM 210 may omit the OSC 200 and, in some implementations, the L-band ROADM 210 may be in communication with, and controlled by, the controller 185.

In some implementations, the third optical signal may further pass into a second optical combiner 192*b* operable to combine the third optical signal with an L-band optical signal received from the L-band ROADM 210.

As shown in FIG. 2D, the spectrally-resolved measurement device 198 and the OSC 200 are shared for both directions of the first transmission line segment 22*a*. In other implementations, however, each direction may have a dedicated OSC 200 and/or a dedicated spectrally-resolved measurement device 198.

In one implementation, the ASE idler 240 may be optically coupled to each ROADM 110. As shown in FIG. 2D, the ASE idler 240 is optically coupled to the second WSS 108*b* (e.g., a mux WSS) of the ROADM 110. The ASE idler 240 may be constructed to generate broad-spectrum light by spontaneous emission (i.e., ASE noise) in an optical amplifier in the C-band, the L-band, and/or the C+L band. For example, the ASE idler 240 constructed as a C-band ASE idler may be in communication with a C-band ROADM (described above) while the ASE idler 240 constructed as an L-band idler may be in communication with an L-band ROADM (described above). In some implementations, the ASE idler 240 is constructed as part of the ROADM 110, such that each ROADM 110 includes the ASE idler 240. In other embodiments, the ASE idler 240 is constructed separately from the ROADM 110 and may be shared between multiples of the ROADMs 110.

The number of devices illustrated in FIG. 2D are provided for explanatory purposes. In practice, there may be additional devices, fewer devices, different devices, or differently arranged devices than are shown in FIG. 2D. Furthermore, two or more of the devices illustrated in FIG. 2D may be implemented within a single device, or a single device illustrated in FIG. 2D may be implemented as multiple, distributed devices. Additionally, one or more of the devices illustrated in FIG. 2D may perform one or more function described as being performed by another one or more of the devices illustrated in FIG. 2D.

Figure 3A:
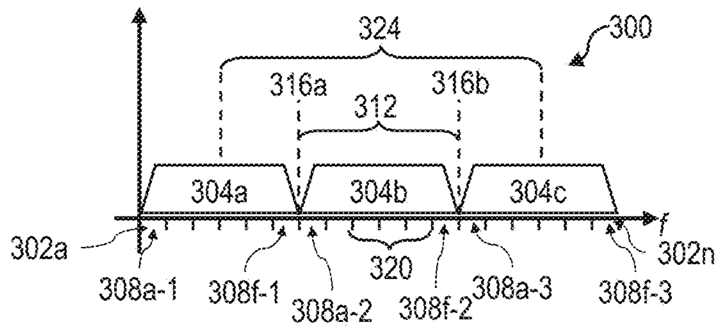
FIG. 3A is a diagram of an exemplary implementation of an optical spectrum partitioned into spectral slices and comprising a series of ASE passbands constructed in accordance with the present disclosure.

Referring now to FIG. 3A, shown therein is a diagram of an exemplary implementation of an optical spectrum 300 partitioned into spectral slices 302*a-n* and comprising a series of ASE passbands 304 constructed in accordance with the present disclosure. As shown, the ASE passbands 304 include a first ASE passband 304*a*, a second ASE passband 304*b*, and a third ASE passband 304*c*. Each of the ASE passbands 304 comprise a set of spectral slices 308*a-n* of the spectral slices 302*a-n* and is aligned to the spectral slices 308 that the particular ASE passband 304 comprises. In this way, the ASE passbands 304 may be said to be aligned to a WSS grid. As shown, the first ASE passband 304*a* comprises first spectral slices 308*a*-1 to 308*af*-1, the second ASE passband 304*b* comprises second spectral slices 308*a*-2 to 308*f*-2, and the third ASE passband 304*c* comprises third spectral slices 308*a*-3 to 308*f*-3. Is should be understood that the number of spectral slices 308 of each ASE passband 304 may be determined based on a desired granularity and may include additional, or fewer, spectral slices 308. The number of spectral slices 308 within an optical spectrum may be determined based on system limitations of the WSS 108 used in the ROADMs 110.

Each ASE passband 304 may comprise a default bandwidth 312 bound by an allocated start frequency 316*a* and an allocated end frequency 316*b*. The ASE passband 304 must include at least a portion of the default bandwidth 312 (e.g., must include at least one spectral slice within the default bandwidth 312), such that the ASE passband 304 is "anchored" to the default bandwidth 312. Each allocated frequency 316 may be a particular frequency of edge spectral slices 308. For example, the second ASE passband 304*b* may include a first edge spectral slice shown as the second spectral slice 308*a*-2 and a second edge spectral slice shown as the second spectral slice 308*f*-2. In the optical spectrum 300 of the optical signal being empty of user signal passbands (USPs), each ASE passband 304 occupies the respective default bandwidth 312 between the respective allocated frequencies 316, and are evenly spaced through the optical spectrum 300.

In one implementation, the default bandwidth 312 may have the same optical bandwidth for each of the ASE passbands 304 in the optical signal 300. For example, the processor 186 may partition the optical spectrum into a predetermined number of ASE passbands 304. Based on the width of the optical signal 300, the processor 186 may then determine a respective default bandwidth 312 for each of the ASE passbands 300, as well as a respective allocated start frequency 316*a* and a respective allocated end frequency 316*b*. In one implementation, when the optical bandwidth 300 is divided into 384 spectral slices by the WSS 108, and each ASE passband 304 comprises six spectral slices 308, the optical spectrum 300 may be divided into 64 ASE passbands having equal respective default bandwidths.

The processor 186 may store the default bandwidth 312, the allocated start frequency 316*a*, and the allocated end frequency 316*b* for each of the ASE passbands 300 in the memory 188, for example, as a band layout map. The band layout map may include a plurality of tracking attributes, for example, one or more of: the default bandwidth, the allocated start frequency, the allocated end frequency, a current start frequency 500*a*, a current end frequency 500*b*, a current bandwidth 504, an adopted left bandwidth 508*a*, an adopted right bandwidth 508*b*, an unusable left bandwidth 512*a*, an unusable right bandwidth 512*b*, combinations thereof, and/or the like.

Figure 5A:
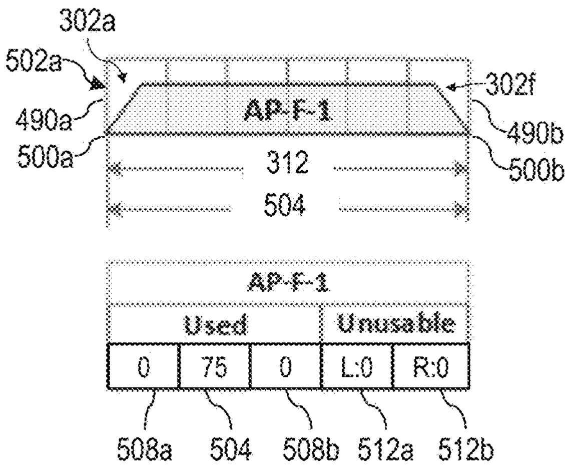
FIG. 5A is a diagram of an exemplary implementation of a first ASE passband in relation to respective tracking attributes.

When no USP has been loaded onto the optical signal, the current start frequency 500*a* may be set to the allocated start frequency, the current end frequency 500*b* may be set to the allocated end frequency, the current bandwidth 504 may be set to the default bandwidth, and the adopted left bandwidth 508*a*, the adopted right bandwidth 508*b*, the unusable left bandwidth 512*a*, and the unusable right bandwidth 512*b* may all be set to zero (0), as shown in FIG. 5A.

In one implementation, the processor 186 may further store a minimum ASE passband width 320, e.g., as a system parameter, in the memory 188. The minimum ASE passband width 320 may be determined based on filter abilities of the WSS 108. For example, the minimum ASE passband width 320 may be, by example only, three spectral slices due to edge attenuation of the WSS 108. Additionally, the processor 186 may further store a maximum ASE passband width 324, e.g., as a system parameter, in the memory 188. The maximum ASE passband width may be, for example, a maximum number of spectral slices that can be claimed by any particular ASE passband. The maximum ASE passband width 324 may be set based on system parameters, such as the default bandwidth. For example, the maximum ASE passband width 324 may be one spectral slice less than twice the default bandwidth 312. In other implementations, for example, the maximum ASE passband width 324 may be equal to the default bandwidth 312 plus twice the minimum ASE passband width 320 less two spectral slices 308.

Figure 3B:
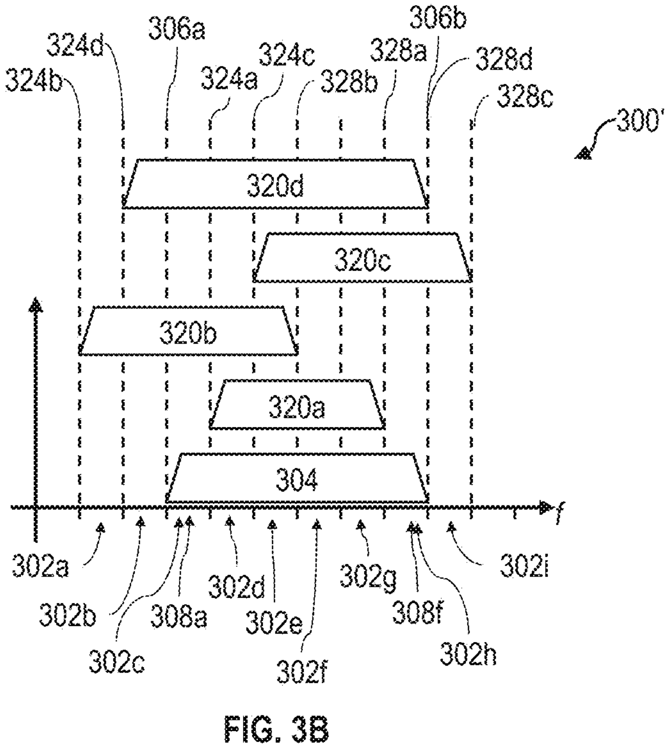
FIG. 3B is a diagram of an exemplary implementation of an optical spectrum comprising spectral slices and showing relationships between an ASE passband and a user signal passband.

Referring now to FIG. 3B, shown therein is a diagram of an exemplary implementation of an optical spectrum 300' comprising spectral slices 302*a-l* and showing relationships between an ASE passband 304 and a user signal passband 320. The ASE passband 304 is shown with a current start frequency 306*a* and a current end frequency 306*b*.

A first USP 320*a* is shown with a first USP bandwidth comprising a first set of spectral slices 302*d-g* and with a first USP start frequency 324*a* and a first USP end frequency 328*a* that are between the current start frequency 306*a* and the current end frequency 306*b*. Thus, the ASE passband 304 may be considered to be subsuming, or enveloping, the first USP 320*a*.

A second USP 320*b* is shown with a second USP bandwidth comprising a second set of spectral slices 302*a-e* and with a second USP start frequency 324*b* that is less than (or, in other implementations, equal to) the current start frequency 306*a* and a second USP end frequency 328*b* that is between the current start frequency 306*a* and the current end frequency 306*b*, such that the user bandwidth of the second USP 320*b* partially contains spectral slices 308 of the ASE passband 304; thus, the second USP 320*b* partially overlaps the ASE passband 304 on the left side.

A third USP 320*c* is shown with a third USP bandwidth comprising a third set of spectral slices 302*e-i* and with a third USP start frequency 324*c* that is between the current start frequency 306*a* and the current end frequency 306*b* and a third USP end frequency 328*c* that is greater than (or, in other implementations, equal to) the current end frequency 306*b*, such that the user bandwidth of the third USP 320*c* partially contains spectral slices 308 of the ASE passband 304; thus, the third USP 320*c* partially overlaps the ASE passband 304 on the right side.

A fourth USP 320*d* is shown with a fourth USP bandwidth comprising a fourth set of spectral slices 302*b-h* and with a fourth USP start frequency 324*d* that is less than (or, in other implementations, equal to) the current start frequency 306*a* and a fourth USP end frequency 328*d* that is greater than (or, in other implementations, equal to) the current end frequency 306*b*, such that the user bandwidth of the third USP 320*c* fully contains spectral slices 308 of the ASE passband 304; thus, the fourth USP 320*d* fully overlaps or subsumes the ASE passband 304.

Figure 4:
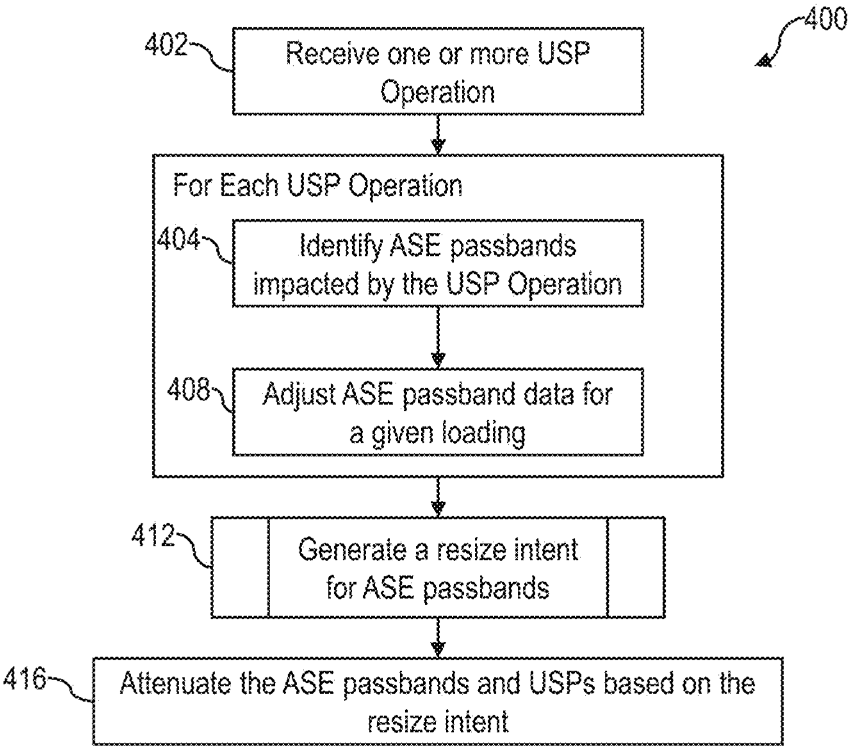
FIG. 4 is a process flow diagram of an exemplary implementation of an ASE management process constructed in accordance with the present disclosure.

Referring now to FIG. 4, shown therein is a process flow diagram of an exemplary implementation of an ASE management process 400 constructed in accordance with the present disclosure. The ASE management process 400 generally comprises the steps of: receiving one or more USP operation (step 402); for each user signal passband (USP) operation: identifying ASE passbands impacted by the USP operation (step 404), and adjusting ASE passband data for a given loading (step 408); generating a resize intent for each identified ASE passband (step 412); and attenuating the ASE passbands and USPs based on the resize intent (step 416). Generally, the steps of the ASE management process 400 may be stored as a series of processor-executable instructions that cause one or more of: the ROADM processor 186 of the controller 185 and the node processor 90, or the like, in communication with other components of the network element 14 and/or the WSS 108, to perform the steps of the ASE management process 400. Hereinafter, for simplicity and not limitation, the steps of the ASE management process 400 will be described in relation to the ROADM processor 186 of the controller 185 performing various actions; however, it should be understood that the processor 90 may perform the same or similar steps in conjunction with, or in place of, the processor 186, unless specifically stated otherwise.

In some implementations, the ASE management process 400 may start when the processor 186 receives a USP operation associated with one or more USP (step 402). The USP operation may be one or more of an activation operation and a deactivation operation. The activation operation may be an operation to activate a particular user signal passband, while a deactivation operation may be an operation to deactivate a particular user signal passband. In some implementations, each of the activation operation and the deactivation operation further include USP identifying information, such as a USP start and USP end frequency, a USP start and USP end spectral slice, and a USP bandwidth and at least one of: the USP start frequency, the USP end frequency, the USP start spectral slice, the USP end spectral slice, and a USP central frequency. In this way, the processor 186 may determine a particular portion of the bandwidth of the optical signal affected by the USP operation.

In one implementation, identifying ASE passbands impacted by the USP operation (step 404) may include the processor 186 comparing the USP to the band layout map to identify one or more ASE passband having a current bandwidth or a default bandwidth that overlaps with the USP of the USP operation. In some implementations, identifying the ASE passbands impacted by the USP operation (step 404) may further include the processor 186 identifying one or more ASE passband adjacent to the ASE passbands having the default bandwidth 312 and/or the current bandwidth overlapping the USP. The one or more adjacent ASE passband may be, for example, a particular ASE passband immediately preceding or immediately succeeding the identified ASE passband. For example, referring back to FIG. 3A, the first ASE passband 304*a* is immediately preceding the second ASE passband 304*b* and the third ASE passband 304*c* is immediately succeeding the second ASE passband 304*b*, thus the first ASE passband 304*a* may be considered adjacent to the second ASE passband 304*b* and the third ASE passband 304*c* may be considered adjacent to the second ASE passband 304*b*. Note, while the first ASE passband 304*a* may precede the third ASE passband 304*c*, the first ASE passband 304*a* does not immediately precede the third ASE passband 304*c*, thus the first ASE passband 304*a* and the third ASE passband 304*c* are not considered adjacent to each other.

In some implementations, the band layout map may include the tracking attributes for each ASE passband in one of the C-band, the L-band, or both the C+L band. In one implementation, identifying ASE passbands impacted by the USP operation (step 404) may occur on a per-band basis. For example, if the USP operation only includes USPs on the C-band, then step 404 may be performed only on the C-band. Likewise, if the USP operation only includes USPs on the L-band, then step 404 may be performed only on the L-band.

In one implementation, identifying ASE passbands impacted by the USP operation (step 404) may include the processor 186 generating a bandwidth tracker comprising the tracking attributes of the band layout map for each of the identified ASE passbands. In some implementations, the processor 186 may further initialize additional tracking attributes such as a new start frequency set to the current start frequency and a new end frequency set to the current end frequency.

In one implementation, identifying ASE passbands impacted by the USP operation (step 404) may include the processor 186 determining a particular ASE passband is overlapping with the USP bandwidth when at least one of the USP start frequency and the USP end frequency is between, or equal to, the current start frequency and the current end frequency of the particular ASE passband.

In one implementation, adjusting ASE passband data for a given loading (step 408) may include the processor 186 adjusting one or more of the tracking attributes of the band tracker for the identified ASE passbands based on the USP operation. In one implementation, adjusting ASE passband data for a given loading (step 408) may include the processor 186 identifying tracking attributes resulting in a single, deterministic solution for a given USP operation and current loading of the optical signal. In this way, the band layout map may be deterministically recreated as needed, for example, upon restart (reboot, or power cycle) of the ROADM 110 and/or the network element 14, or other loss of the band layout map from memory.

In one implementation, adjusting ASE passband data for a given loading (step 408) may include, when the USP operation is the activation operation, for each of the identified ASE passbands, the processor 186 determining a new passband boundary based on the USP, performing an existential eligibility check, and updating the tracking attributes for the identified ASE passband. In one implementation, determining the new passband boundary based on the USP, performing the existential eligibility check, and updating the tracking attributes for the identified ASE passband may be performed by the processor 186 sequentially on the identified ASE passbands from lowest allocated start frequency to highest allocated start frequency or from highest allocated start frequency to lowest allocated start frequency.

In one implementation, determining the new passband boundary based on the USP may include the processor 186: setting the new start frequency and the new end frequency to zero when the USP bandwidth encompasses the allocated start frequency and the allocated end frequency (e.g., the USP start frequency is less than or equal to the allocated start frequency or current start frequency and the USP end frequency is greater than or equal to the allocated end frequency or current end frequency and as shown by the fourth USP 320*d* in FIG. 3B); setting the new end frequency to the USP start frequency and the new start frequency to the current start frequency when the USP bandwidth encompasses only the allocated end frequency or current end frequency (as shown by the third USP 320*c* in FIG. 3B); setting the new start frequency to the USP end frequency and the new end frequency to the current end frequency when the USP bandwidth encompasses only the allocated start frequency or the current start frequency (as shown by the second USP 320*b* in FIG. 3B); and setting the new start frequency and the new end frequency to invalid when the USP bandwidth is between the current bandwidth or default bandwidth, e.g., is between the allocated/current start frequency and the allocated/current end frequency as shown by the first USP 320*a* in FIG. 3B).

Figure 5B:
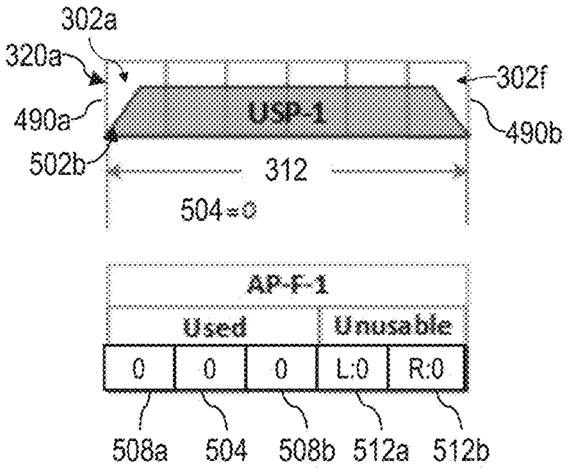
FIG. 5B is a diagram of an exemplary implementation of a second ASE passband in relation to respective tracking attributes.
Figure 5C:
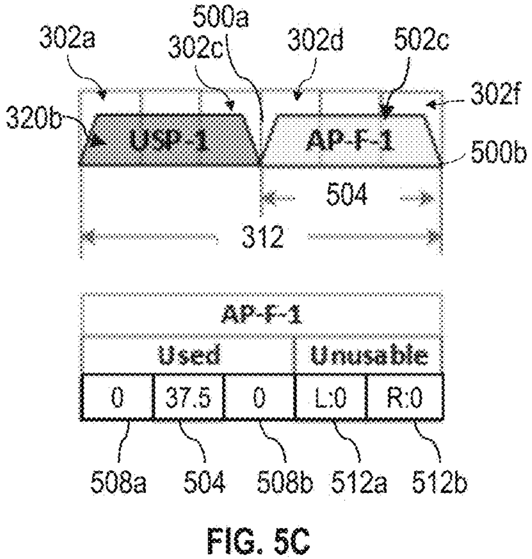
FIG. 5C is a diagram of an exemplary implementation of a third ASE passband in relation to respective tracking attributes.
Figure 5D:
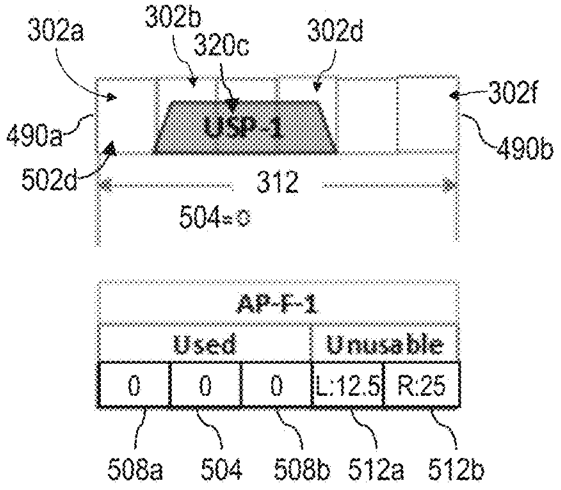
FIG. 5D is a diagram of an exemplary implementation of a fourth ASE passband in relation to respective tracking attributes.

In one implementation, performing the existential eligibility check and updating the tracking attributes for the identified ASE passband may include the processor 186, in response to determining that a difference between the new end frequency and the new start frequency is less than a minimum passband size as shown in FIG. 5D, updating at least one of: the unusable left bandwidth 512*a* of the identified ASE passband and the unusable right bandwidth 512*b* of the identified ASE passband to include a first bandwidth between the new end frequency and the new start frequency, and setting the new end frequency and the new start frequency to zero.

Performing the existential eligibility check and updating the tracking attributes for the identified ASE passband may further include the processor 186, in response to determining the new start frequency and the new end frequency is invalid as shown in FIG. 5D, setting the unusable left bandwidth 512*a* to include a second bandwidth between the current start frequency 500*a* and the USP start frequency 324; setting the unusable right bandwidth 512*b* to include a third bandwidth between the current end frequency 500*b* and the USP end frequency 328; and setting the new start frequency and the new end frequency to zero.

In one implementation, adjusting ASE passband data for the given loading (step 408) may further include, when the USP operation is the activation operation, the processor 186 executing a bandwidth adoption for each identified ASE passband. In one implementation, bandwidth adoption for the identified ASE passbands may be performed after the processor 186 has determined the new passband boundary, performed the existential eligibility check, and updated the tracking attributes for each of the identified ASE passbands.

In one implementation, executing the bandwidth adoption for each of the identified ASE passbands includes the processor 186 determining at least one adjacent ASE passband immediately preceding the identified ASE passband as a preceding ASE passband or immediately succeeding the identified ASE passband as a succeeding ASE passband.

Figure 5E:
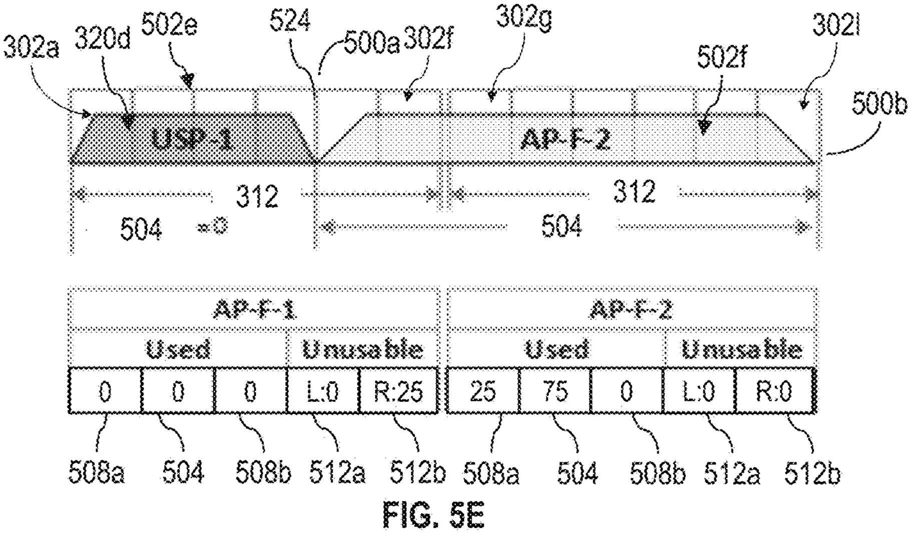
FIG. 5E is a diagram of an exemplary implementation of fifth and sixth ASE passbands in relation to respective tracking attributes.
Figure 5F:
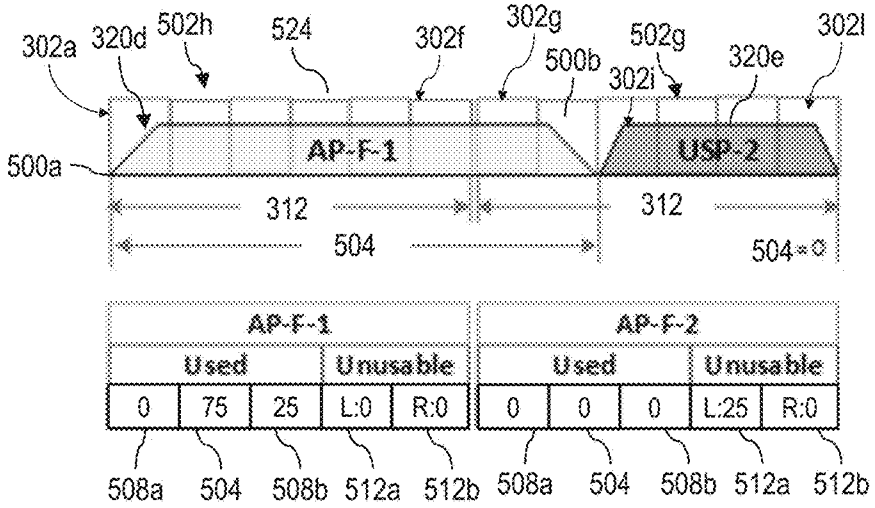
FIG. 5F is a diagram of an exemplary implementation of seventh and eighth ASE passbands in relation to respective tracking attributes.
Figure 5G:
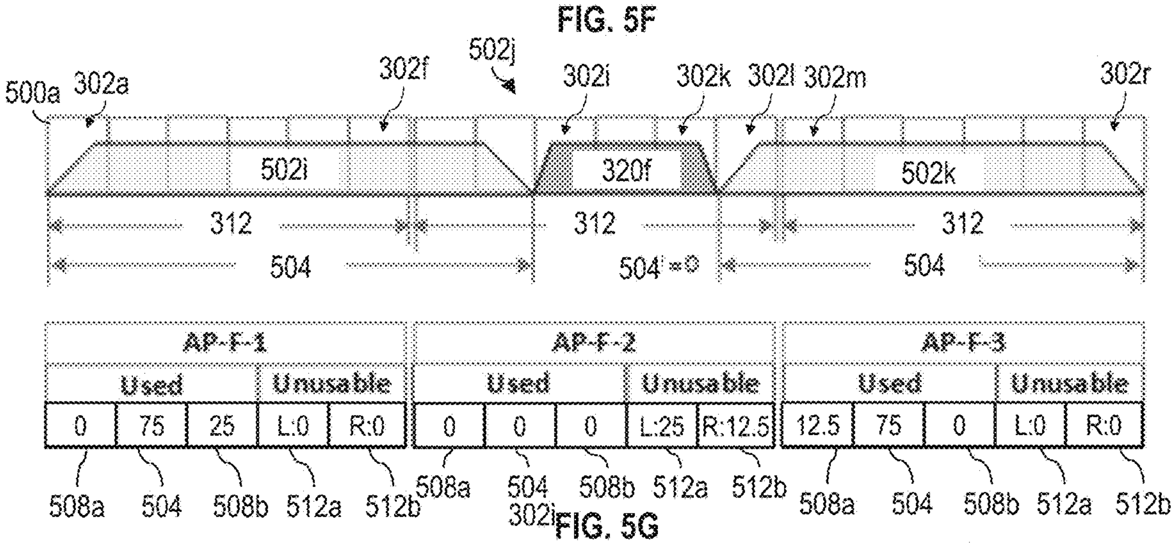
FIG. 5G is a diagram of an exemplary implementation of a ninth, tenth, and eleventh ASE passbands in relation to respective tracking attributes.
Figure 5H:
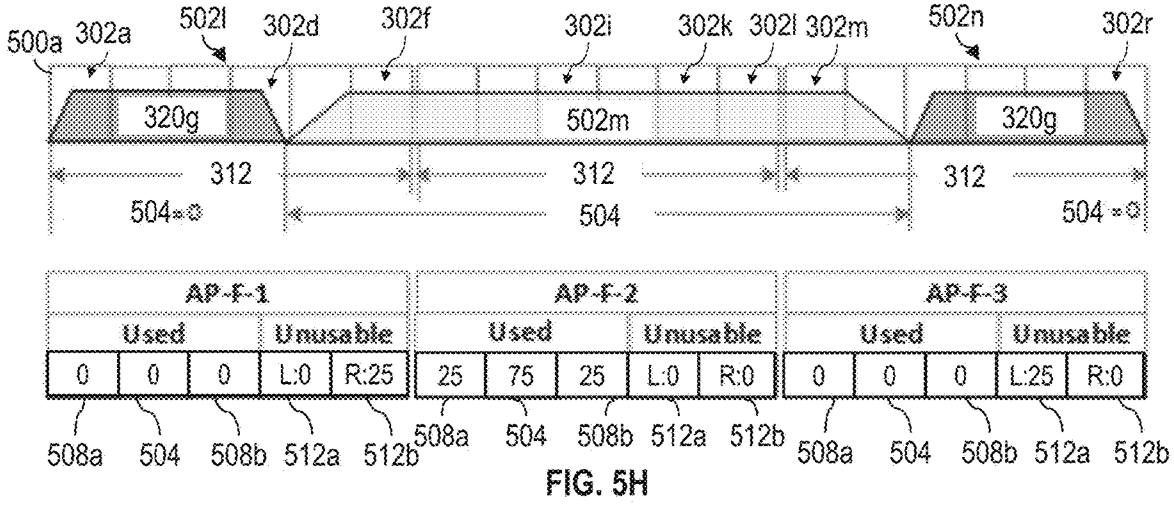
FIG. 5H is a diagram of an exemplary implementation of a twelfth, thirteenth, and fourteenth ASE passbands in relation to respective tracking attributes.

In one implementation, executing the bandwidth adoption for each of the identified ASE passbands further includes the processor 186 adjusting a new end frequency 520 from the current end frequency 500*b* for preceding ASE passband 304*a* based on the allocated start frequency and the unusable left bandwidth 512*a* of the identified ASE passband 304*b* when the current end frequency of the preceding ASE passband is set to the allocated end frequency of the preceding ASE passband and setting the adopted right bandwidth 508*b* of the preceding ASE passband 304*a* to the unusable left bandwidth 512*a* of the identified ASE passband 304*b* as shown in FIGS. 5F-5H.

In one implementation, executing the bandwidth adoption for each of the identified ASE passbands further includes the processor 186 adjusting the new start frequency 524 for succeeding ASE passband 304*c* based on the allocated end frequency and the unusable right bandwidth 512*b* of the identified ASE passband 304*b* when the current start frequency of the preceding ASE passband is set to the allocated start frequency of the preceding ASE passband and setting the adopted left bandwidth 508*a* of the succeeding ASE passband 304*c* to the unusable right bandwidth 512*b* of the identified ASE passband 304*b* as shown in FIGS. 5E, 5G, and 5H.

In one implementation, executing the bandwidth adoption for each of the identified ASE passbands further includes the processor 186, upon determining that the unusable right bandwidth of the identified ASE passband and the unusable left bandwidth of the succeeding ASE passband are non-zero: setting the new start frequency of the identified ASE passband to the allocated end frequency less the unusable right bandwidth of the identified ASE passband; setting the new end frequency to the allocated start frequency plus the unusable left bandwidth of the succeeding ASE passband; and setting the adopted right bandwidth of the identified ASE passband to the unusable left bandwidth of the succeeding ASE passband.

In one implementation, executing the bandwidth adoption for each of the identified ASE passbands further includes the processor 186, upon determining that the unusable left bandwidth of the identified ASE passband and the unusable right bandwidth of the preceding ASE passband are non-zero: setting the new start frequency of the identified ASE passband to the allocated end frequency less the unusable right bandwidth of the preceding ASE passband; setting the new end frequency to the allocated start frequency plus the unusable left bandwidth of the identified ASE passband; and setting the adopted left bandwidth of the identified ASE passband to the unusable right bandwidth of the preceding ASE passband.

In one implementation, adjusting ASE passband data for the given loading (step 408) may include, when the USP operation is the deactivation operation, for each of the identified ASE passbands, the processor 186 determining a new passband boundary based on the user signal passband (USP) and updating the plurality of tracking attributes of the bandwidth tracker for the identified ASE passband. In one implementation, determining the new passband boundary based on the user signal passband and updating the plurality of tracking attributes of the bandwidth tracker for the identified ASE passband may be performed by the processor 186 sequentially on the identified ASE passbands from lowest allocated start frequency to highest allocated start frequency or from highest allocated start frequency to lowest allocated start frequency.

In one implementation, determining a new passband boundary based on the user signal passband may include the processor 186 setting the new start frequency and the new end frequency of the identified ASE passband based at least in part on a relationship between the current start frequency and the current end frequency of the identified ASE passband and the USP bandwidth of the user signal passband.

In one implementation, determining a new passband boundary based on the user signal passband may include the processor 186 setting the new start frequency to the allocated start frequency when the USP bandwidth and the current start frequency have a subsuming relationship, when the user bandwidth encompasses the current start frequency and the identified ASE passband is active, or when the USP bandwidth encompasses the current end frequency and the identified ASE passband is inactive.

In one implementation, determining a new passband boundary based on the user signal passband may include the processor 186 setting the new end frequency to the allocated end frequency when the USP bandwidth and the current start frequency have a subsuming relationship, when the USP bandwidth encompasses the current end frequency and the identified ASE passband is active, or when the USP bandwidth encompasses the current start frequency and the identified ASE passband is inactive.

In one implementation, determining a new passband boundary based on the user signal passband may include the processor 186 setting the new start frequency to the current start frequency when the USP start frequency is between the current start frequency and the allocated end frequency.

In one implementation, determining a new passband boundary based on the user signal passband may include the processor 186 setting the new end frequency to the current end frequency when the USP end frequency is between the current end frequency and the allocated start frequency.

In one implementation, updating the plurality of tracking attributes of the bandwidth tracker for the identified ASE passband includes the processor 186 updating the unusable left bandwidth, the unusable right bandwidth, the adopted left bandwidth, and the adopted right bandwidth tracking attributes based on the new start frequency and the new end frequency of the identified ASE passband.

In one implementation, adjusting ASE passband data for the given loading (step 408) may further include, when the USP operation is the deactivation operation, the processor 186 executing at least one of a bandwidth surrender and a bandwidth adoption for each identified ASE passband.

In one implementation, executing at least one of a bandwidth surrender and a bandwidth adoption for each identified ASE passband includes the processor 186, for each adjacent ASE passband, adjusting one or more of: the new start frequency and the new end frequency to surrender adopted bandwidth overlapping with the default bandwidth of the identified ASE passband.

In one implementation, executing at least one of a bandwidth surrender and a bandwidth adoption for each identified ASE passband includes the processor 186, for each identified ASE passband, adjust one or more of: the new start frequency and the new end frequency to include adjacent unusable bandwidth of one or more adjacent ASE passbands.

In one implementation, generating a resize intent for each identified ASE passband (step 412) may include the processor 186 generating the resize intent based on the tracking attributes of the bandwidth tracker.

In one implementation, generating a resize intent for each identified ASE passband (step 412) may include the processor 186 sorting the adjusted ASE passbands from lowest allocated start frequency to highest allocated start frequency and, for each adjusted ASE passband, updating the resize intent to include a deactivate intent for the adjusted ASE passband when the adjusted ASE passband is active and a new start frequency is equal to a new end frequency; updating the resize intent to include an activate intent when the adjusted ASE passband is inactive and has the new start frequency not equal to the new end frequency; updating the resize intent to include an upsize intent when the adjusted ASE passband has either the new start frequency lesser than the current start frequency or the new end frequency is greater than the current end frequency; and updating the resize intent to include a downsize intent when the adjusted ASE passband has either the new end frequency lesser than the current end frequency or the new start frequency is greater than the current start frequency.

In one implementation, attenuating the ASE passbands and USPs based on the resize intent (step 416) of the ASE management process 400 further includes sending, by the processor 186, one or more control signal to the wavelength selective switch 108 to cause the wavelength selective switch 108 to apply the optical filter to the ASE passbands 304 in the series of ASE passbands 304 in accordance with the resize intent for each of the one or more adjusted ASE passbands.

Referring now to FIGS. 5A-5H, in combination, shown therein are diagrams of exemplary implementations of ASE passbands 304 in relation to respective tracking attributes. Shown in FIG. 5A is a first ASE passband 502*a* having tracking attributes of: a default bandwidth 312, an allocated start frequency 490*a* associated with a spectral slice 302*a*, an allocated end frequency 490*b* associated with a spectral slice 302*f*, a current start frequency 500*a*, a current end frequency 500*b*, a current bandwidth 504 extending from the spectral slice 302*a* through the spectral slice 302*f*, an adopted left bandwidth 508*a* of zero, an adopted right bandwidth 508*b* of zero, an unusable left bandwidth 512*a* of zero, and an unusable right bandwidth 512*b* of zero. FIG. 5A shows the first ASE passband 502*a* prior to an USP operation affecting the first ASE passband 502*a*. The ASE passbands 502 may be constructed in accordance with the ASE passbands 304 detailed above.

Shown in FIG. 5B is a first USP 320*a* positioned over spectral slices 302*a* through 302*f*, thus a second ASE passband 502*b* has tracking attributes of: a default bandwidth 312, which stays the same, extending from the spectral slice 302*a* through 302*f*, the allocated start frequency 490*a* associated with the spectral slice 302*a*, the allocated end frequency 490*b* associated with the spectral slice 302*f*, the current start frequency 500*a* of zero, the current end frequency 500*b* of zero, the current bandwidth 504 of zero, an adopted left bandwidth 508*a* of zero, an adopted right bandwidth 508*b* of zero, an unusable left bandwidth 512*a* of zero, and an unusable right bandwidth 512*b* of zero. FIG. 5B shows the second ASE passband 502*b* having the first USP 320*a* fully encompassing the second ASE passband 502*b*.

Shown in FIG. 5C is a second USP 320*b* positioned over spectral slices 302*a* through 302*d*, thus a third ASE passband 502*c* has respective tracking attributes of: the default bandwidth 312, which stays the same, extending from the spectral slice 302*a* through 302*f*, the allocated start frequency 490*a* associated with the spectral slice 302*a*, the allocated end frequency 490*b* associated with the spectral slice 302*f*, the current start frequency 500*a* associated with the spectral slice 302*d*, the current end frequency 500*b* associated with the spectral slice 302*f*, the current bandwidth 504 of 37.5 GHz extending from the spectral slice 302*d* through 302*f*, an adopted left bandwidth 508*a* of zero, an adopted right bandwidth 508*b* of zero, an unusable left bandwidth 512*a* of zero, and an unusable right bandwidth 512*b* of zero. FIG. 5C shows the third ASE passband 502*c* having surrendered spectral slices 302*a-c* to the second USP 320*b*.

Shown in FIG. 5D is a third USP 320*c* positioned over spectral slices 302*b* through 302*d*, thus a fourth ASE passband 502*d* has respective tracking attributes of: the default bandwidth 312, which stays the same, extending from the spectral slice 302*a* through 302*f*, the allocated start frequency 490*a* associated with the spectral slice 302*a*, the allocated end frequency 490*b* associated with the spectral slice 302*f*, the current start frequency 500*a* of invalid, the current end frequency 500*b* of invalid, the current bandwidth 504 of zero, an adopted left bandwidth 508*a* of zero, an adopted right bandwidth 508*b* of zero, an unusable left bandwidth 512*a* of one spectral slice (e.g., spectral slice 302*a*), and an unusable right bandwidth 512*b* of two spectral slices (e.g., spectral slices 302*e-f*). FIG. 5D shows the fourth ASE passband 502*d* having surrendered spectral slices 302*b-d* to the third USP 320*c* where the third USP 320*c* is enveloped within the fourth ASE passband 502*d*.

Shown in FIG. 5E is a fourth USP 320*d* positioned over spectral slices 302*a* through 302*d*, thus a fifth ASE passband 502*e* has respective tracking attributes of: the default bandwidth 312, which stays the same, extending from the spectral slice 302*a* through 302*f*, the allocated start frequency 490*a* associated with the spectral slice 302*a*, the allocated end frequency 490*b* associated with the spectral slice 302*f*, the current start frequency 500*a* (not shown) of zero, the current end frequency 500*b* (not shown) of zero, the current bandwidth 504 of zero, an adopted left bandwidth 508*a* of zero, an adopted right bandwidth 508*b* of zero, an unusable left bandwidth 512*a* of zero, and an unusable right bandwidth 512*b* of two spectral slices (e.g., spectral slices 302*e-f*). Further shown is a sixth ASE passband 502*f* having respective tracking attributes of: the default bandwidth 312, which stays the same, extending from the spectral slice 302*g* through 302*l*, the allocated start frequency 490*a* associated with the spectral slice 302*g*, the allocated end frequency 490*b* associated with the spectral slice 302*h*, the current start frequency 500*a* associated with spectral slice 302*e*, the current end frequency 500*b* associated with spectral slice 302*l*, the current bandwidth 504 of eight spectral slices (e.g., spectral slices 302*e-l*), an adopted left bandwidth 508*a* of two spectral slices (e.g., the unusable right bandwidth 512*b* of the fifth ASE passband 502*e*, spectral slices 302*e-f*), an adopted right bandwidth 508*b* of zero, an unusable left bandwidth 512*a* of zero, and an unusable right bandwidth 512*b* of zero. FIG. 5E shows the fifth ASE passband 502*e* having surrendered spectral slices 302*a-d* to the third USP 320*c* and spectral slices 302*e-f* to the sixth ASE passband 502*f*, which has in turn adopted the spectral slices 302*e-f*.

Shown in FIG. 5F is a fifth USP 320*e* positioned over spectral slices 302*i* through 302*l*, thus a seventh ASE passband 502*g* has respective tracking attributes of: the default bandwidth 312, which stays the same, extending from the spectral slice 302*g* through 302*l*, the allocated start frequency 490*a* associated with the spectral slice 302*g*, the allocated end frequency 490*b* associated with the spectral slice 302*l*, the current start frequency 500*a* (not shown) of zero, the current end frequency 500*b* (not shown) of zero, the current bandwidth 504 of zero, an adopted left bandwidth 508*a* of zero, an adopted right bandwidth 508*b* of zero, an unusable left bandwidth 512*a* of two spectral slices (e.g., spectral slices 302*g-h*), and an unusable right bandwidth 512*b* of zero. Further shown is a eighth ASE passband 502*h* having respective tracking attributes of: the default bandwidth 312, which stays the same, extending from the spectral slice 302*a* through 302*f*, the allocated start frequency 490*a* associated with the spectral slice 302*a*, the allocated end frequency 490*b* associated with the spectral slice 302*f*, the current start frequency 500*a* associated with spectral slice 302*a*, the current end frequency 500*b* associated with spectral slice 302*h*, the current bandwidth 504 of eight spectral slices (e.g., spectral slices 302*a-h*), an adopted left bandwidth 508*a* of zero, an adopted right bandwidth 508*b* of two spectral slices (e.g., the unusable left bandwidth 512*a* of the seventh ASE passband 502*g*, spectral slices 302*g-h*), an unusable left bandwidth 512*a* of zero, and an unusable right bandwidth 512*b* of zero. FIG. 5F shows the seventh ASE passband 502*g* having surrendered spectral slices 302*i-l* to the fourth USP 320*d* and spectral slices 302*g-h* to the eighth ASE passband 502*h*, which has in turn adopted the spectral slices 302*g-h*.

Shown in FIG. 5G is a sixth USP 320*f* positioned over spectral slices 302*i* through 302*k*, thus a ninth ASE passband 502*i* has respective tracking attributes of: the default bandwidth 312, which stays the same, extending from the spectral slice 302*a* through 302*f*, the allocated start frequency 490*a* associated with the spectral slice 302*a*, the allocated end frequency 490*b* associated with the spectral slice 302*g*, the current start frequency 500*a* associated with a spectral slice 302*a*, the current end frequency 500*b* associated with spectral slice 302*h*, the current bandwidth 504 of 100 GHz (e.g., spectral slices 302*a-h*), an adopted left bandwidth 508*a* of zero, an adopted right bandwidth 508*b* of 25 Ghz (e.g., spectral slices 302*g-h*), an unusable left bandwidth 512*a* of zero, and an unusable right bandwidth 512*b* of zero. Further shown is a tenth ASE passband 502*j* having respective tracking attributes of: the default bandwidth 312, which stays the same, extending from the spectral slice 302*a* through 302*f*, the allocated start frequency 490*a* associated with the spectral slice 302*g*, the allocated end frequency 490*b* associated with the spectral slice 302*l*, the current start frequency 500*a* (not shown) of zero, the current end frequency 500*b* (not shown) of zero, the current bandwidth 504 of zero, an adopted left bandwidth 508*a* of zero, an adopted right bandwidth 508*b* of zero, an unusable left bandwidth 512*a* of 25 Ghz (e.g., spectral slices 302*g-h* which have been adopted by the ninth ASE passband 302*i*), and an unusable right bandwidth 512*b* of 12.5 Ghz (e.g., spectral slice 302*l*). Further shown is an eleventh ASE passband 502*k* having respective tracking attributes of: the default bandwidth 312, which stays the same, extending from the spectral slice 302*m* through 302*r*, the allocated start frequency 490*a* associated with the spectral slice 302*m*, the allocated end frequency 490*b* associated with the spectral slice 302*r*, the current start frequency 500*a* associated with the spectral slice 302*l*, the current end frequency 500*b* associated with spectral slice 302*r*, the current bandwidth 504 of 87.5 GHz extending from spectral slice 302*l-r*, an adopted left bandwidth 508*a* of 12.5 GHZ (e.g., spectral slice 302*l* which has been adopted from the tenth ASE passband 302*j*), an adopted right bandwidth 508*b* of zero, an unusable left bandwidth 512*a* of zero, and an unusable right bandwidth 512*b* of zero. FIG. 5G shows the tenth ASE passband 502*j* having surrendered spectral slices 302*i-k* to the sixth USP 320*f*.

Shown in FIG. 5G is a seventh USP 320*g* positioned over spectral slices 302*a* through 302*d*, thus a twelfth ASE passband 502*l* has respective tracking attributes of: the default bandwidth 312, the allocated start frequency 490*a* associated with the spectral slice 302*a*, the allocated end frequency 490*b* associated with the spectral slice 302*f*, the current start frequency 500*a* of zero, the current end frequency 500*b* of zero, the current bandwidth 504 of zero, an adopted left bandwidth 508*a* of zero, an adopted right bandwidth 508*b* of zero, an unusable left bandwidth 512*a* of zero, and an unusable right bandwidth 512*b* of 25 Ghz (e.g., spectral slices 302*e-f*. Further shown is a thirteenth ASE passband 502*m* having respective tracking attributes of: the default bandwidth 312, extending from the spectral slice 302*g* through 302*l*, the allocated start frequency 490*a* associated with the spectral slice 302*g*, the allocated end frequency 490*b* associated with the spectral slice 302*l*, the current start frequency 500*a* associated with the spectral slice 302*e*, the current end frequency 500*b* associated with the spectral slice 302*n*, the current bandwidth 504 of 125 GHz (e.g., extending from spectral slice 302*e* through 302*n*), an adopted left bandwidth 508*a* 25 GHz (spectral slices 302*e-f*), an adopted right bandwidth 508*b* of 25 Ghz (spectral slices 302*m-n*), an unusable left bandwidth 512*a* of zero, and an unusable right bandwidth 512*b* of zero. Further shown is an fourteenth ASE passband 502*n* having respective tracking attributes of: the default bandwidth 312, extending from the spectral slice 302*m* through 302*r*, the allocated start frequency 490*a* associated with the spectral slice 302*m*, the allocated end frequency 490*b* associated with the spectral slice 302*r*, the current start frequency 500*a* of zero, the current end frequency 500*b* of zero, the current bandwidth 504 of zero, an adopted left bandwidth 508*a* of zero, an adopted right bandwidth 508*b* of zero, an unusable left bandwidth 512*a* of 25 GHz (e.g., spectral slices 302*m-n*, which have been adopted by the twelfth ASE passband 502*m*), and an unusable right bandwidth 512*b* of zero. FIG. 5H further shows an eighth USP 320*h* positioned over spectral slices 302*o-r*, and shows the fourteenth ASE passband 502*n* having surrendered spectral slices 302*m-n* to eighth USP 320*h*.

Figure 6:
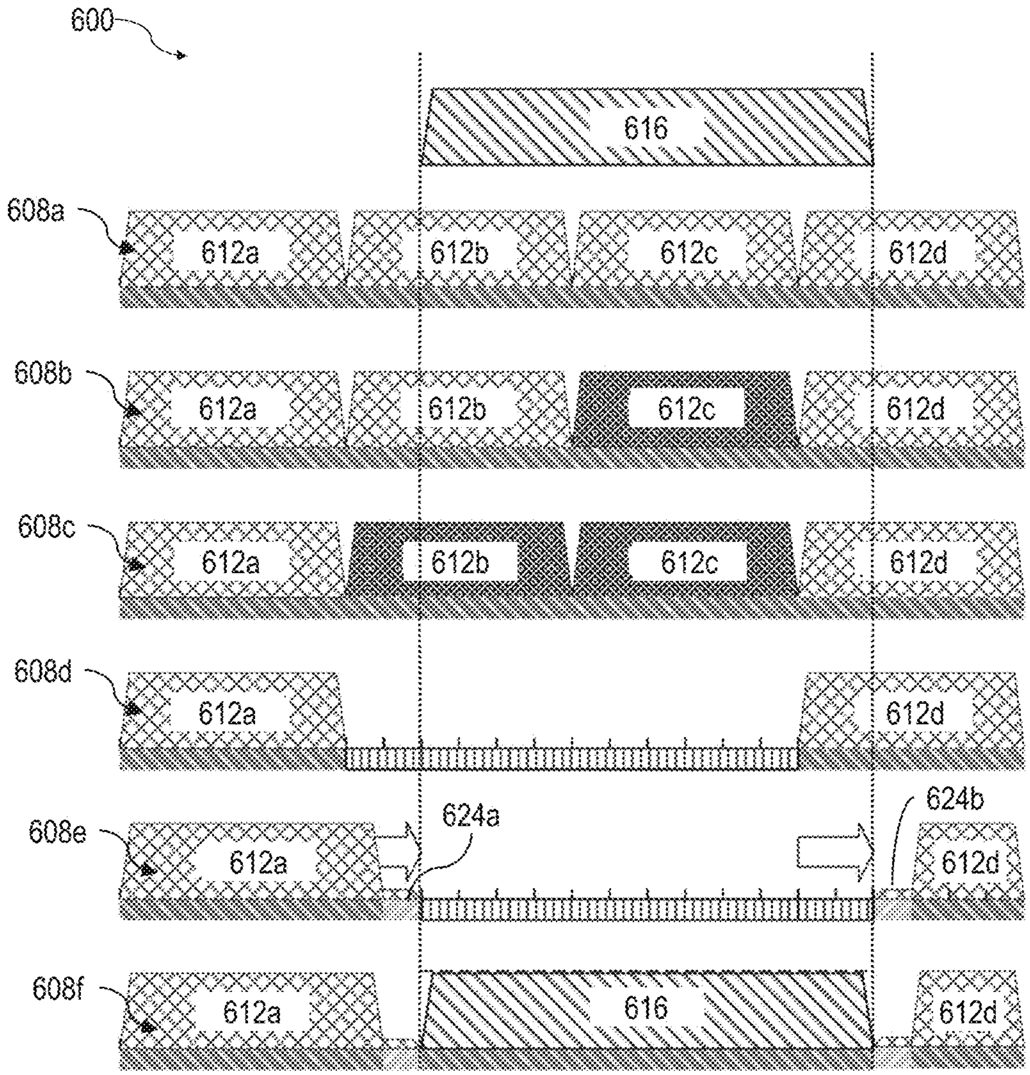
FIG. 6 is a timing diagram of an exemplary implementation of an optical spectrum at multiple points in time during the ASE management process of FIG. 4 having an activation operation as constructed in accordance with the present disclosure.

Referring now to FIG. 6, shown therein is a timing diagram of a hypothetical exemplary implementation of an optical spectrum 600 at multiple points in time 608 during the ASE management process 400 having an activation operation as constructed in accordance with the present disclosure. As shown, a USP operation has been received by the processor 186 to activate a USP 616.

At first time 608*a*, the USP 616 has not been activated, or loaded, onto the optical spectrum 600, thus, the optical spectrum 600 includes only ASE passbands 612. For example, at first time 608*a*, the optical spectrum 600 comprises a first ASE passband 612*a*, a second ASE passband 612*b*, a third ASE passband 612*c*, and a fourth ASE passband 612*d*. It should be understood that while only four ASE passbands 612 are shown, additional ASE passbands 612 may be included in the optical spectrum 600. Further, it should be understood that while only one USP 616 is shown in the optical spectrum 600, additional USPs 616 may be included in the optical spectrum 600.

The processor 186, executing the ASE management process 400 may execute the instructions to identify ASE passbands impacted by the USP operation (step 404). As shown, the first ASE passband 612*b*, the third ASE passband 612*c*, and the fourth ASE passband 612*d* are identified as having spectral slices overlapped by spectral slices of the USP 616. Additionally, the first ASE passband 612*a* is identified as being adjacent to the overlapping ASE passband 612*b*.

The processor 186, executing the ASE management process 400 may adjust ASE passband data for a given loading (step 408). As shown at a second time 608*b*, the third ASE passband 612*c* is identified as being fully encompassed by the USP 616 therefore the third ASE passband 612*c* may be marked for deactivation. As shown at a third time 608*c*, the second ASE passband 612*b* is partially overlapped by the USP 616 such that a number of the spectral slices of the default bandwidth of the second ASE passband 612*b* will be replaced by spectral slices of the USP 616. A count of the remaining spectral slices of the default bandwidth of the second ASE passband 612*b*, however, does not meet or exceed a minimum slice threshold to maintain eligibility of the second ASE passband 612*b*. Therefore, the processor 186 may mark the second ASE passband 612*b* for deletion and identify the remaining spectral slices as unavailable left bandwidth.

Further, as shown in FIG. 6, at a fourth time 608*d* the processor 186 may mark the first ASE passband 612*a* and the fourth ASE passband 612*d* for adjustment. As shown, there is no ASE passband 612 between the first ASE passband 612*a* and the USP bandwidth of the USP 616. Additionally, as shown, the fourth ASE passband 612*d* has a current bandwidth comprising a set of spectral slices that are at least partially contained within the set of spectral slices of the USP bandwidth of the USP 616, resulting in the processor 186 marking the fourth ASE passband 612*d* for adjustment and to mark the spectral slices of the fourth ASE passband 612*d* contained within the set of spectral slices of the USP bandwidth as unusable bandwidth.

At the fourth time 608*d*, the processor 186 may store a resize intent to cause the WSS 108 to attenuate the ASE passbands 612 marked for deletion. For example, as shown, the second ASE passband 612*b* and the third ASE passband 612*c*, which have been marked for deletion, may be attenuated by the WSS 108 to cause the second ASE passband 612*b* and the third ASE passband 612*c* to be removed from the optical spectrum 600.

At a fifth time 608*e*, the processor 186 may store a resize intent to cause the WSS 108 to adjust the one or more ASE passbands 612 marked for adjustment. As shown in FIG. 6, at the fifth time 608*e*, the first ASE passband 612*a*, which is marked for adjustment of expansion, is expanded to adopt the spectral slices of the unusable left bandwidth of the second ASE passband 612*b* and the fourth ASE passband 612*d*, which is marked for adjustment of contraction, is contracted to surrender the spectral slices overlapping with the set of slices of the USP bandwidth of the USP 616.

Further, as shown at the fifth time 608*e* in FIG. 6, in some embodiments, the processor 186 may identify an edge slice 624 of an adjacent ASE passband of the plurality of ASE passbands adjacent to the one or more user signal passband. For example, the processor 186 may consider the set of spectral slices within the current bandwidth of the ASE passband 612, and identify a particular spectral slice adjacent to the set of spectral slices of the USP bandwidth of the USP 616. The processor 186 may then store a resize intent to cause the WSS 108 to suppress the edge slice 624. The processor 186 may consider spectral slices of each ASE passband 612 adjacent to the USP bandwidth of the USP 616. Suppressing the edge slice 624 may include, for example, the WSS 108 attenuating, unloading, or unallocating the edge slice, for example.

As shown in FIG. 6, for example, the edge slices 624 may include a first edge slice 624*a* of the set of spectral slices of the first ASE passband 612*a* and a second edge slice 624*b* of the set of spectral slices of the fourth ASE passband 612*d*. An edge slice 624 is a particular spectral slice within the set of spectral slices of a particular ASE passband 612. As shown in FIG. 6, activating the USP 616 may result in two spectral slices, however, in some implementations, such as when the USP 616 is activated next to another USP that has already been loaded onto the optical spectrum 600, or when the USP 616 is activated at either the upper or lower edge of the optical spectrum 600 (or a particular band of the optical spectrum), activating the USP 616 may result in just one edge slice. In one implementation, the processor 186 may store a resize intent to cause the WSS 108 to suppress the edge slices 624 by causing the WSS 108 to attenuate the ASE noise within the edge slices 624. By attenuating the edge slice, the processor 186 may reduce a chance of cross-talk between the ASE passbands 612 and the USP 616 once the USP 616 is loaded onto the optical spectrum 600. In this way, the edge slice 624 may be considered a guard-band, for example.

In one implementation, the processor 186 may store a resize intent to cause the WSS 108 to simultaneously shrink the fourth ASE passband 612*d* and expand the first ASE passband 612*a*. In some implementations, the processor 186 may cause the WSS 108 to attenuate, or block, the edge slices 624 after the first ASE 612*a* is expanded and the fourth ASE passband 612*d* is shrunk. On other implementations, the processor 186 may cause the WSS 108 to attenuate the edge slices 614 simultaneously with shrinking the fourth ASE passband 612*d* and expanding the first ASE passband 612*a*.

As shown at a sixth time 608*f*, once the ASE passbands 612*a* and 612*d* have been adjusted, the processor 186 may store a resize intent to cause the WSS 108 to load the USP 616 onto the optical spectrum 600. For example, the processor 186 may cause the WSS 108 to ramp-up the USP 616 on the set of spectral slices corresponding to the USP bandwidth of the USP 616.

In some implementations, the USP 616 may be divided into two or more subpassbands. When the USP 616 is divided into two or more subpassbands, the processor 186 may treat each subpassband of the two or more subpassbands as a user signal passband 616. That is, the processor 816 may execute the ASE management process 400 as though each subpassband were a user signal passband 616.

In one implementation, generating a resize intent for each identified ASE passband (step 412) may include the processor 186 generating the resize intent based on the tracking attributes of the bandwidth tracker such that the resize intent includes a series comprising one or more of: an activating operation, a deactivating operation, and a resizing operation, and an order of said operations, to transition the optical signal from the first time 608*a* to the seventh time 608*f*.

Figure 7:
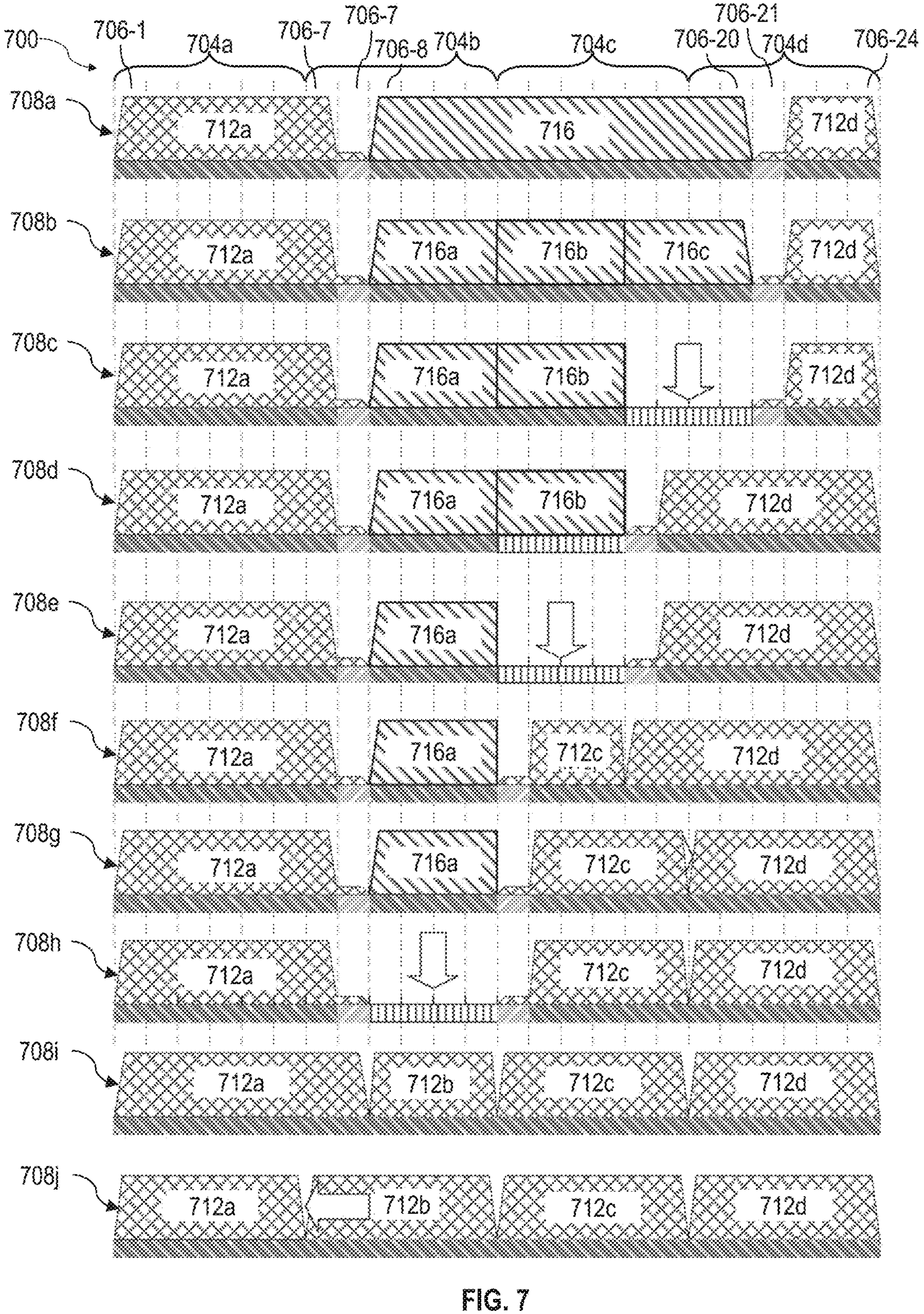
FIG. 7 is a timing diagram of an exemplary implementation of an optical spectrum at multiple points in time during the ASE management process of FIG. 4 having a deactivation operation as constructed in accordance with the present disclosure.

Referring now to FIG. 7, shown therein is a timing diagram of a hypothetical exemplary implementation of an optical spectrum 700 at multiple points in time 708 during the ASE management process 400 having a deactivation operation as constructed in accordance with the present disclosure. As shown, a USP operation has been received by the processor 186 to deactivate a USP 716. Further illustrated are default bandwidths 704*a-n* of respective ASE passbands 712*a-n*. For reference, the optical spectrum 700 is shown with 24 spectral slices 706 (spectral slices 706-1 through 706-24), however, it should be understood that the optical spectrum 700 of the optical signal may contain additional spectral slices 706 as described above. The USP 716 is shown as comprising a USP set of the spectral slices 706 having spectral slices 706-8 through 706-20). In this implementation, the minimum slice threshold is assumed to be three spectral slices.

At a first time 708*a*, the processor 186 has received the deactivation operation for the USP 716. The optical spectrum 700 is shown with a first ASE passband 712*a* filling the first default bandwidth 704*a* and further having an adopted right bandwidth comprising two spectral slices 706, spectral slice 706-7 and 706-8, which are further stored by the processor 186 as unusable left bandwidth for a second ASE passband 712*b* having the second default bandwidth 704*b*. The USP 716 fully encompasses a third ASE passband 712*c* (e.g., the USP set of spectral slices 706 encompass the spectral slices 706 associated with the third default bandwidth 704*c* of the third ASE passband 712*c*). The USP 716 further encompasses two spectral slices 706 of the fourth default bandwidth 704*d* of a fourth ASE passband 712*d*. As shown, the second ASE passband 716*b* is not activated by the WSS 108 because a count of the spectral slices 706 of the second ASE passband 712*b* not occupied by the USP 716 (i.e., two spectral slices 706) does not meet the minimum slice threshold of three spectral slices 706. However, the fourth ASE passband 712*d* is activated by the WSS 108 because a count of the spectral slices 706 of the fourth ASE passband 712*d* not occupied by the USP 716 (i.e., four spectral slices 706) meets or exceeds the minimum slice threshold of three spectral slices 706. Further, as shown in FIG. 7, the processor 186 has caused the WSS 108 to block, suppress, or attenuate edge slices of ASE passbands 712 adjacent to the USP 716 (e.g., spectral slices 706-6 and 706-21).

At a second time 708*b*, the processor 186 has partitioned the USP 716 into subpassbands 716*a*, 716*b*, and 716*c*, each subpassband having a respective subset of the USP set of spectral slices 708. In some implementations, the processor 186 determines to split the USP 716 into two or more subpassbands based on the USP bandwidth of the USP 716. For example, if the USP bandwidth is greater than two times the default bandwidth of the ASE passbands 712, the processor 186 may determine to split the USP 716 into two or more subpassbands. Each subpassband may have, for example, a subpassband bandwidth, which may be greater than the minimum slice threshold. In one implementation, the smallest USP 716 USP bandwidth that may be split into two or more subpassbands has a USP bandwidth of two times the minimum slice threshold.

At a third time 708*c*, the processor 186 may store a resize intent to deactivate the subpassband 716*c*. The processor 186 may deactivate a particular subpassband by causing the WSS 108 to attenuate, suppress, or block the spectral slices 706 associated with the particular subpassband. The timing diagram of the optical spectrum 700 during the ASE management process 400 having the deactivation operation is shown as processing the subpassbands 716*a-c* from right to left (e.g., from highest associated frequencies to lowest associated frequencies), it should be understood that the subpassbands 716*a-c* may be processed in the opposing directions (e.g., from lowest associated frequencies to highest associated frequencies).

At a fourth time 708*d*, the processor 186, executing the ASE management process 400, may cause the fourth ASE passband 712*d* to adopt the spectral slices 708 of the subpassband 716*c*. In this way, the fourth ASE passband 712*d* may retain the default bandwidth 704*d*. However, the subpassband 716*c* relinquished two additional spectral slices 706 associated with the default bandwidth 708*c* of the third ASE passband 712*c*. Since two is less than the minimum slice threshold, the third ASE passband 712*c* fails the existential eligibility check, resulting in the two spectral slices 706 being identified as unusable right bandwidth for the third ASE passband 712*c*. Therefore, the processor 186 causes the fourth ASE passband to adopt the unusable right bandwidth of the third ASE passband 712*c*. The processor 186 may thus identify the adopted bandwidth as adopted left bandwidth of the fourth ASE passband 712*d* and may store the tracking attributes in the memory 188 once the adjustment to the optical spectrum has been performed.

At a fifth time 708*e*, the processor 186 may store a resize intent to deactivate the subpassband 716*b*. As shown, when the processor 186 deactivates the subpassband 716*b*, the spectral slices 706 associated with the subpassband 716*b* are relinquished.

At a sixth time 708*f*, the processor 186 executing the ASE management process 400, may determine that the subset of spectral slices of the subpassband 716*b* and the spectral slices associated with the third bandwidth 704*c* of the third ASE passband 712*c* have at least a count of spectral slices in common equal to or greater than the minimum slice threshold, and, therefore, may store a resize intent to cause the WSS 108 to load the third ASE passband 712*c* on the spectral slices in common. In one implementation, the processor 186 may further store a resize intent to cause and edge slice of the third ASE passband 712*c* to be attenuated.

At a seventh time 708*g*, the processor 186, executing the ASE management process 400, may cause the fourth ASE passband 712*d* to surrender the spectral slices 708 associated with the default bandwidth 704*c* of the third ASE passband 712*c* and cause the third ASE passband 712*c* to adopt the surrendered spectral slices. In one embodiment, the processor 186 may perform the surrender and adoption operations simultaneously. In one implementation, the processor 186 may determine that the third ASE passband 712*c* and the fourth ASE passband 712*d* may be adjusted due to the third ASE passband 712*c* having a current end frequency less than the allocated end frequency and the fourth ASE passband 712*d* having an adopted left bandwidth greater than zero, thereby indicating that the fourth ASE passband 712*d* is occupying optical bandwidth of the third ASE passband 712*c*. The third passband 712*c*, therefor, now occupies the spectral slices 706 associated with the default bandwidth 704*c* and the fourth passband 712*d* occupies the spectral slices 706 associated with the default bandwidth 704*d*, and therefore, the third ASE passband 712*c* and the fourth ASE passband 712*d* have an adopted left bandwidth, adopted right bandwidth, unusable left bandwidth, and unusable right bandwidth of zero. In this way, by maintaining the tracking attributes and generating the band layout map, resource demands on the processor 186 may be reduced, thereby increasing efficiency of the processor 186 and the memory 188.

At an eighth time 708*h*, the processor 186 may store a resize intent to deactivate the subpassband 716*a*. As shown, when the processor 186 deactivates the subpassband 716*a*, the spectral slices 706 associated with the subpassband 716*a* are relinquished.

At a ninth time 708*i*, the processor 186 executing the ASE management process 400, may determine that the subset of spectral slices of the subpassband 716*a* and the spectral slices associated with the default bandwidth 704*b* of the second ASE passband 712*b* have at least a count of spectral slices in common equal to or greater than the minimum slice threshold, and, therefore, may store a resize intent to cause the WSS 108 to load the second ASE passband 712*b* on the spectral slices in common. In one implementation, the processor 186, upon determining that no subpassband 716*a-c* remains in the optical spectrum, may further store a resize intent to cause the WSS 108 to remove attenuation of the edge slices (e.g., of the first ASE passband 712*a* and the third ASE passband 712*c*), such that the edge slices are no longer blocked, suppressed, or attenuated.

At a tenth time 708*j*, the processor 186, executing the ASE management process 400, may cause the first ASE passband 712*a* to surrender the spectral slices 708 associated with the default bandwidth 704*b* of the second ASE passband 712*b* and cause the second ASE passband 712*b* to adopt the surrendered spectral slices. In one embodiment, the processor 186 may perform the surrender and adoption operations simultaneously. In one implementation, the processor 186 may determine that the first ASE passband 712*a* and the second ASE passband 712*b* may be adjusted due to the second ASE passband 712*b* having a current start frequency greater than the allocated start frequency and the first ASE passband 712*a* having an adopted right bandwidth greater than zero, thereby indicating that the first ASE passband 712*a* is occupying optical bandwidth of the default bandwidth 704*b* of the second ASE passband 712*b*. After adjustment, the first passband 712*a* now occupies the spectral slices 706 associated with the default bandwidth 704*a* and the second passband 712*b* occupies the spectral slices 706 associated with the default bandwidth 704*b*, and therefore, the first ASE passband 712*a* and the second ASE passband 712*b* have an adopted left bandwidth, adopted right bandwidth, unusable left bandwidth, and unusable right bandwidth of zero.

In one implementation, by the processor 186 executing the ASE management process 400, the ASE passbands 716 of the optical signal may be tracked within the optical spectrum without increased resource usage. As detailed above, the ASE management process 400 results in efficient management of limited resources within the network element 14, and within components of the network element 14, such as within the ROADM 110. Further, the ASE management process 400 results in a single deterministic solution to the band layout map. Therefore, upon bootup/power cycling of the network element 14, whether intentional or unintentional, the processor 186 may generate the same band layout map.

In one implementation, generating a resize intent for each identified ASE passband (step 412) may include the processor 186 generating the resize intent based on the tracking attributes of the bandwidth tracker such that the resize intent includes a series comprising one or more of: an activating operation, a deactivating operation, and a resizing operation, and an order of said operations, to transition the optical signal from the first time 708*a* to the tenth time 708*j*.

ILLUSTRATIVE IMPLEMENTATIONS

The following is a number list of non-limiting illustrative clauses of the inventive concepts disclosed herein:

Clause 1. A network element, comprising: a light source operable to generate an optical signal having a user signal passband having a USP bandwidth, the one or more user signal passband based on user data; an amplified spontaneous emission (ASE) source configured to generate ASE noise; a wavelength selective switch operable to receive the ASE noise and the user signal passband, to partition the ASE noise into a series of ASE passbands, each ASE passband comprising a default bandwidth bound by an allocated start frequency and an allocated end frequency, to apply an optical filter to the ASE passbands, and to combine the ASE passbands and the user signal passband into an output optical signal; a processor; and a memory comprising a non-transitory processor-readable medium storing a band layout map having a current start frequency and a current end frequency for each ASE passband of the series of ASE passbands, the band layout map comprising a unique deterministic layout of the ASE passbands within the optical signal, and processor-executable instructions that when executed by the processor cause the processor to:

- receive a user signal passband operation associated with the user signal passband, the user signal passband operation being one of an activation operation and a deactivation operation;
- identify one or more ASE passbands overlapped by or adjacent to the user signal passband based at least in part on the band layout map and generate a bandwidth tracker comprising a plurality of tracking attributes for each of the one or more identified ASE passbands, the plurality of tracking attributes including the current start frequency and the current end frequency;
- adjust the plurality of tracking attributes for the one or more identified ASE passbands based on the user signal passband operation; and
- generate resize intent instructions for the one or more identified ASE passbands based on the adjusted tracking attributes of the bandwidth tracker.

Clause 2. The network element of Clause 1, wherein the optical signal includes at least one of: a C-band and an L-band, and wherein the band layout map includes a band layout map for each band of the optical signal.

Clause 3. The network element of Clause 1, wherein the instruction to identify one or more ASE passbands impacted by the user signal passband operation further includes instructions to:

- compare the band layout map to the user signal passband to determine at least one overlapping ASE passband of the series of ASE passbands having a respective default bandwidth overlapping with the USP bandwidth; and
- determine at least one adjacent ASE passband immediately preceding or immediately succeeding the at least one overlapping ASE passband within the series of ASE passbands;
- wherein the at least one overlapping ASE passband and the at least one adjacent ASE passband are provided as the identified as the one or more ASE passbands.

Clause 4. The network element of Clause 3, wherein the user signal passband includes a USP start frequency and a USP end frequency, and wherein the instruction to determine at least one overlapping ASE passband of the series of ASE passbands having the respective default bandwidth overlapping with the USP bandwidth includes the instruction to:

- determine the at least one overlapping ASE passband of the series of ASE passbands is overlapping with the USP bandwidth when at least one of the USP start frequency and the USP end frequency is between, or equal to, the current start frequency and the current end frequency of the at least one overlapping ASE passband.

Clause 5. The network element of Clause 1, wherein the user signal passband operation is the activation operation, and the instruction to adjust the plurality of tracking attributes for the one or more identified ASE passbands further includes instructions to: for each of the identified ASE passbands:

determine a new passband boundary based on the user signal passband; and perform an existential eligibility check and update the plurality of tracking attributes of the bandwidth tracker for the identified ASE passband; and execute a bandwidth adoption for each identified ASE passband.

Clause 6. The network element of Clause 5, wherein the instruction to adjust the plurality of tracking attributes for the one or more identified ASE passbands is performed sequentially on the one or more identified ASE passbands from lowest allocated start frequency to highest allocated start frequency.

Clause 7. The network element of Clause 5, wherein the instruction to adjust the plurality of tracking attributes for the one or more identified ASE passbands is performed sequentially on the one or more identified ASE passbands from highest allocated start frequency to lowest allocated start frequency.

Clause 8. The network element of Clause 5, wherein the user signal passband includes a USP start frequency and a USP end frequency and the plurality of tracking attributes further includes a new start frequency and a new end frequency, and wherein the instruction to determine the new passband boundary includes instructions to:

set the new start frequency and the new end frequency to zero when the USP bandwidth encompasses the allocated start frequency and the allocated end frequency;

set the new end frequency to the USP start frequency and the new start frequency to the current start frequency when the USP bandwidth encompasses only the allocated end frequency;

set the new start frequency to the USP end frequency and the new end frequency to the current end frequency when the USP bandwidth encompasses only the allocated start frequency; and set the new start frequency and the new end frequency to invalid when the USP bandwidth is between the allocated start frequency and the allocated end frequency.

Clause 9. The network element of Clause 8, wherein the plurality of tracking attributes further includes an unusable left bandwidth and an unusable right bandwidth, and wherein the instruction to perform an existential eligibility check and update the plurality of tracking attributes includes instructions to:

in response to a determination that a difference between the new end frequency and the new start frequency is less than a minimum passband size, update at least one of: the unusable left bandwidth and the unusable right bandwidth to include a first bandwidth between the new end frequency and the new start frequency, and set the new end frequency and the new start frequency to zero; and in response to a determination that the new start frequency and the new end frequency is invalid, set the unusable left bandwidth to include a second bandwidth between the current start frequency and the USP start frequency, set the unusable right bandwidth to include a third bandwidth between the current end frequency and the USP end frequency, and set the new start frequency and the new end frequency to zero.

Clause 10. The network element of Clause 9, wherein the wavelength selective switch has a minimum supported passband, and wherein the minimum passband size is the minimum supported passband.

Clause 11. The network element of Clause 9, wherein the plurality of tracking attributes further includes an adopted left bandwidth and an adopted right bandwidth, and wherein the instruction to execute the bandwidth adoption for each identified ASE passband includes instructions to:

determine at least one adjacent ASE passband immediately preceding the identified ASE passband as a preceding ASE passband or immediately succeeding the identified ASE passband as a succeeding ASE passband;

adjust the new end frequency for the preceding ASE passband when the preceding ASE passband is active based on the allocated start frequency and the unusable left bandwidth of the identified ASE passband and set the adopted right bandwidth of the preceding ASE passband to the unusable left bandwidth of the identified ASE passband, the preceding ASE passband being active based on the allocated end frequency of the preceding ASE passband being the same as the current end frequency of the preceding ASE passband;

adjust the new start frequency for the succeeding ASE passband when the succeeding passband is active based on the allocated end frequency and the unusable right bandwidth of the identified ASE passband and set the adopted left bandwidth of the succeeding ASE passband to the unusable right bandwidth of the identified ASE passband, the succeeding ASE passband being active based on the allocated start frequency of the succeeding ASE passband being the same as the current start frequency of the succeeding ASE passband;

upon a determination that the unusable right bandwidth of the identified ASE passband and the unusable left bandwidth of the succeeding ASE passband are non-zero, set the new start frequency of the identified ASE passband to the allocated end frequency less the unusable right bandwidth of the identified ASE passband, set the new end frequency to the allocated start frequency plus the unusable left bandwidth of the succeeding ASE passband, and set the adopted right bandwidth of the identified ASE passband to the unusable left bandwidth of the succeeding ASE passband; and upon a determination that the unusable left bandwidth of the identified ASE passband and the unusable right bandwidth of the preceding ASE passband are non-zero, set the new start frequency of the identified ASE passband to the allocated end frequency less the unusable right bandwidth of the preceding ASE passband, set the new end frequency to the allocated start frequency plus the unusable left bandwidth of the identified ASE passband, and set the adopted left bandwidth of the identified ASE passband to the unusable right bandwidth of the preceding ASE passband.

Clause 12. The network element of Clause 1, wherein the user signal passband operation is the deactivation operation, and the instruction to adjust one or more ASE passband data for the one or more identified ASE passbands further includes instructions to: for each of the identified ASE passbands:

determine a new passband boundary based on the user signal passband; and update the plurality of tracking attributes of the bandwidth tracker for the identified ASE passband; and execute at least one of a bandwidth surrender and a bandwidth adoption for each identified ASE passband.

Clause 13. The network element of Clause 12, wherein the instruction to adjust the plurality of tracking attributes for the one or more identified ASE passbands is performed sequentially on the one or more identified ASE passbands from lowest allocated start frequency to highest allocated start frequency.

Clause 14. The network element of Clause 5, wherein the instruction to adjust the plurality of tracking attributes for the one or more identified ASE passbands is performed sequentially on the one or more identified ASE passbands from highest allocated start frequency to lowest allocated start frequency.

Clause 15. The network element of Clause 12, wherein the new passband boundary includes a new start frequency and a new end frequency, and wherein the instruction to determine the new passband boundary includes instructions to:

set the new start frequency and the new end frequency of the identified ASE passband based at least in part on a relationship between the current start frequency and the current end frequency of the identified ASE passband and the USP bandwidth of the user signal passband.

Clause 16. The network element of Clause 12, wherein the user signal passband includes a USP start frequency and a USP end frequency and the plurality of tracking attributes further includes a new start frequency and a new end frequency, and wherein the instruction to determine the new passband boundary includes instructions to:

set the new start frequency to the allocated start frequency when the USP bandwidth and the current start frequency have a subsuming relationship, when the USP bandwidth encompasses the current start frequency and the identified ASE passband is active, or when the USP bandwidth encompasses the current end frequency and the identified ASE passband is inactive;

set the new end frequency to the allocated end frequency when the USP bandwidth and the current start frequency have a subsuming relationship, when the USP bandwidth encompasses the current end frequency and the identified ASE passband is active, or when the USP bandwidth encompasses the current start frequency and the identified ASE passband is inactive;

set the new start frequency to the current start frequency when the USP start frequency is between the current start frequency and the allocated end frequency; and set the new end frequency to the current end frequency when the USP end frequency is between the current end frequency and the allocated start frequency.

Clause 17. The network element of Clause 16, wherein the plurality of tracking attributes further includes an unusable left bandwidth, an unusable right bandwidth, an adopted left bandwidth, and an adopted right bandwidth, and wherein the instruction to update the plurality of tracking attributes includes instructions to:

update the unusable left bandwidth, the unusable right bandwidth, the adopted left bandwidth, and the adopted right bandwidth tracking attributes based on the new start frequency and the new end frequency of the identified ASE passband.

Clause 18. The network element of Clause 17, wherein the instruction to execute at least one of the bandwidth surrender and the bandwidth adoption for each identified ASE passband includes instructions to:

for each adjacent ASE passband, adjust one or more of: the new start frequency and the new end frequency to surrender adopted bandwidth overlapping with the default bandwidth of the identified ASE passband; and for each identified ASE passband, adjust one or more of: the new start frequency and the new end frequency to include adjacent unusable bandwidth of one or more adjacent ASE passbands.

Clause 19. The network element of Clause 1, wherein the instruction to generate the resize intent based on each of the one or more adjusted ASE passbands based on the bandwidth tracker includes instructions to:

sort the one or more adjusted ASE passbands from lowest allocated start frequency to highest allocated start frequency; and for each of the one or more adjusted ASE passbands:

update the resize intent to include a deactivate intent for the adjusted ASE passband when the adjusted ASE passband is active and a new start frequency is equal to a new end frequency;

update the resize intent to include an activate intent when the adjusted ASE passband is inactive and has the new start frequency not equal to the new end frequency;

update the resize intent to include an upsize intent when the adjusted ASE passband has either the new start frequency lesser than the current start frequency or the new end frequency is greater than the current end frequency; and update the resize intent to include a downsize intent when the adjusted ASE passband has either the new end frequency lesser than the current end frequency or the new start frequency is greater than the current start frequency.

Clause 20. The network element of Clause 19, wherein the memory further stores instructions that cause the processor to:

send one or more control signal to the wavelength selective switch to cause the wavelength selective switch to apply the optical filter to the ASE passbands in the series of ASE passbands in accordance with the resize intent for each of the one or more adjusted ASE passbands; and update the band layout map based on the resize intent for each of the one or more adjusted ASE passbands.

Clause 21. A network element, comprising:

a light source operable to generate an optical signal having a plurality of spectral slices and operable to generate one or more user signal passband on a first set of the plurality of spectral slices, the one or more user signal passband based on user data;

an amplified spontaneous emission (ASE) source configured to generate ASE noise;

a wavelength selective switch operable to receive the ASE noise and the one or more user signal passband, to partition the ASE noise into a plurality of ASE passbands, each ASE passband comprising a default bandwidth bound by an allocated start frequency and an allocated end frequency, the default bandwidth comprising a second set of the plurality of spectral slices, to apply an optical filter to the plurality of ASE passbands, and to combine the plurality of ASE passbands and one or more user signal passband into an output optical signal;

a processor; and a memory comprising a non-transitory processor-readable medium storing processor-executable instructions that when executed by the processor cause the processor to:

cause the light source to generate the one or more user signal passband on the first set of the plurality of spectral slices based on received user data;

for each ASE passband of the plurality of ASE passbands:

mark the passband for deactivation or adjustment when the ASE passband meets one or more of the following, by comparing the first set of the plurality of spectral slices with the second set of the plurality of spectral slices:

mark the ASE passband for deactivation when the second set of the plurality of spectral slices comprises spectral slices entirely contained within the first set;

mark the ASE passband for deactivation when the second set of the plurality of spectral slices comprises spectral slices that are partially contained within the first set of the plurality of spectral sliced and the second set of the plurality of spectral slices includes a count of spectral slices less than a minimum slice threshold;

mark the ASE passband for deactivation when the second set of the plurality of spectral slices does not include at least one of the allocated start frequency and the allocated end frequency;

mark the ASE passband for adjustment when the second set of the plurality of spectral slices comprises spectral slices that are partially contained within the first set, and the second set of the plurality of spectral slices includes a count of spectral slices meets or exceeds a minimum slice threshold; and mark the ASE passband for adjustment when the second set of the plurality of spectral slices comprises spectral slices not contained within the first set of the plurality of spectral slices, and there is no ASE passband disposed between the first set of the plurality of spectral slices and the second set of the plurality of spectral slices;

deactivate the ASE passbands marked for deactivation;

adjust the bandwidth size of the ASE passbands marked for adjustment; and ramp up the one or more user signal passband on the first set of the plurality of spectral slices.

Clause 22. The network element of Clause 21, wherein the memory further includes instructions that cause the processor to:

adjust the bandwidth size of the ASE passbands marked for adjustment by either:

shrinking the ASE passbands marked for adjustment and having overlap between the first set of the plurality of spectral slices and the second set of the plurality of spectral slices by removing one or more spectral slice from the second set of the plurality of spectral slices that is also contained within the first set of the plurality of spectral slices until the second set of spectral slices is mutually exclusive with the first set of the plurality of spectral slices; and expanding the ASE passbands marked for adjustment and having no overlap between first set of the plurality of spectral slices and the second set of the plurality of spectral slices by including one or more spectral slice within the optical signal between the first set of the plurality of spectral slices and the second set of the plurality of spectral slices in the second set of the plurality of spectral slices.

Clause 23. The network element of Clause 22, wherein the memory further includes instructions that cause the processor to:

after adjusting the bandwidth size of the ASE passbands marked for adjustment, determine a number of spectral slices in the second set for each of the ASE passbands and mark any ASE passband determined to have the number of spectral slices below the minimum slice threshold for deactivation.

Clause 24. The network element of Clause 22, wherein the memory further includes instructions that cause the processor to:

simultaneously shrinking the ASE passbands marked for adjustment and having overlap between the first set of the plurality of spectral slices and the second set of the plurality of spectral slices and expanding the ASE passbands marked for adjustment and having no overlap between first set of the plurality of spectral slices and the second set of the plurality of spectral slices.

Clause 25. The network element of Clause 21, wherein the memory further includes instructions that cause the processor to: identify an edge slice of an adjacent ASE passband of the plurality of ASE passbands adjacent to the one or more user signal passband; and suppress the edge slice of the adjacent ASE passband.

Clause 26. The network element of Clause 25, wherein the instruction to suppress the edge slice further includes instructions to: cause the wavelength selective switch to attenuate the ASE noise within the edge slice.

Clause 27. The network element of Clause 25, wherein the instruction to suppress the edge slice further includes instructions to: cause the wavelength selective switch to unallocate the edge slice.

Clause 28. The network element of Clause 25, wherein the instruction to suppress the edge slice is executed prior to the instruction to ramp up the one or more user signal passband.

Clause 29. The network element of Clause 21, wherein each ASE passband includes at least three spectral slices.

Clause 30. The network element of Clause 21, wherein the memory further includes instructions that cause the processor to: cause the wavelength selective switch to evenly allocate the default bandwidth to the plurality of ASE passbands within the optical signal; and save the allocated default bandwidth in the memory.

Clause 31. The network element of Clause 21, wherein the memory further includes instructions that cause the processor to:

determine if the one or more user signal passband can be split into multiple subpassbands, each subpassband comprising a subset of the first set of the plurality of spectral slices;

responsive to determining that the one or more user signal passband can be split into multiple sub-passbands, iteratively perform the marking, deactivating, adjusting, and ramp up instructions, based on the subset of the first set of the plurality of spectral slices, for each subpassband, sequentially.

Clause 32. A network element, comprising:

an amplified spontaneous emission (ASE) source configured to generate ASE noise;

a wavelength selective switch operable to receive an optical signal having a plurality of spectral slices and a user signal passband on a first set of the plurality of spectral slices, the user signal passband being based on user data, to receive the ASE noise and the user signal passband, to partition the ASE noise into a plurality of ASE passbands, each ASE passband comprising a default bandwidth bound by an allocated start frequency and an allocated end frequency and a current bandwidth having a current start frequency and a current end frequency, the default bandwidth comprising a second set of the plurality of slices, the second set having a default quantity of spectral slices, to apply an optical filter to the plurality of ASE passbands, and to combine the plurality of ASE passbands and the user signal passband into an output optical signal;

a processor; and a memory comprising a non-transitory processor-readable medium storing processor-executable instructions that when executed by the processor cause the processor to: deactivate the user signal passband;

responsive to determining if the first set of the plurality of spectral slices includes at least one slice of a particular second set of the plurality of slices associated with a particular ASE passband and has a minimum passband size, load the particular ASE passband onto the first set of the plurality of spectral slices;

responsive to determining that the particular ASE passband includes a first quantity of slices different than the default quantity and an adjacent ASE passband includes a second quantity of slices different than the default quantity, contract the adjacent ASE passband to the default quantity by surrendering one or more spectral slices nearest the particular ASE passband and expand the particular ASE passband to include the one or more surrendered spectral slices.

Clause 33. The network element of Clause 32, wherein the user signal passband includes at least two subpassbands.

Clause 34. The network element of Clause 33, wherein the user signal passband has a first edge frequency and a second edge frequency, and wherein the memory further includes instructions that cause the processor to: determine an order for deactivating the at least two subpassbands, the order progressing from the first edge frequency of the user signal passband to the second edge frequency; and deactivate the one or more subpassbands according to the determined order.

Clause 35. The network element of Clause 33, wherein the memory further includes instructions that cause the processor to: after deactivating each subpassband, identify an edge slice within the subset of the deactivated subpassband nearest an adjacent subpassband; and suppress the edge slice of the ASE passband by causing the wavelength selective switch to attenuate the ASE noise within the edge slice.

Clause 36. The network element of Clause 32, wherein the memory further includes instructions that cause the processor to:

after deactivating the user signal passband, identify any remaining empty spectral slices within the first set of the plurality of spectral slices;

identify one or more unloaded ASE passband to be loaded onto the optical signal, the one or more unloaded ASE passband being one of the plurality of passbands having a current bandwidth of zero and having an overlap between the second set of the plurality of spectral slices and the remaining empty spectral slices; and load each unloaded ASE passband of the one or more unloaded ASE passband onto the remaining empty spectral slices.

Clause 37. The network element of Clause 36, wherein the memory further includes instructions that cause the processor to: expand the loaded ASE passband to fill one or more adjacent empty spectral slice within the first set of the plurality of spectral slices.

Clause 38. The network element of Clause 37, wherein the memory further includes instructions that cause the processor to:

after expanding the loaded ASE passband, evaluate the loaded ASE passband and at least one adjacent ASE passband to determine if either of the loaded ASE passband or the at least one adjacent ASE passband has a respective current bandwidth occupying a respective default bandwidth of the other of the loaded ASE passband or the at least one adjacent ASE passband; and responsive to determining that the respective current bandwidth occupies the respective default bandwidth, adjust the loaded ASE passband and the at least one adjacent ASE passband to have a current end frequency coincide with the allocated end frequency and a current start frequency coincide with the allocated start frequency;

wherein adjusting the loaded ASE passband and the at least one adjacent ASE passband comprises contracting any of the loaded ASE passband and the at least one adjacent ASE passband having a first quantity of spectral slices greater than the default quantity and expanding any of the loaded ASE passband and the at least one adjacent ASE passband having a second quantity of spectral slices less than the default quantity.

Clause 39. The network element of Clause 32, wherein the instruction to load the particular ASE passband further includes instructions that cause the processor to: identify a suppressed edge slice of the adjacent ASE passband, the suppressed edge slice being a particular spectral slice within the adjacent ASE passband being suppressed by the wavelength selective switch; and cause the wavelength selective switch to un-suppress the suppressed edge slice.

Clause 40. The network element of Clause 32, wherein the network element further comprises: a light source operable to generate the optical signal having the plurality of spectral slices and operable to generate the user signal passband on the first set of the plurality of spectral slices.

Clause 41. A method, comprising:

receiving a request to deactivate a user signal passband occupying a first set of spectral slices;

splitting the user signal passband into one or more subpassbands, each subpassband comprising a subset of the first set of spectral slices; and for each subpassband of the one or more subpassbands: deactivating the subpassband;

responsive to determining the subset of spectral slices includes a spectral slice associated with a default bandwidth of a particular amplified spontaneous emission (ASE) passband, loading the particular ASE passband onto the subset of spectral slices; and responsive to determining that the particular ASE passband and an adjacent ASE passband have overlapping current bandwidths, adjusting the particular ASE passband and the adjacent ASE passband to restore a boundary frequency between the particular ASE passband and the adjacent ASE passband to one of an allocated start frequency and an allocated end frequency, the boundary frequency being a boundary between the default bandwidth of the particular ASE passband and a default bandwidth of the adjacent ASE passband.

Clause 42. The method of Clause 41, further comprising: determining an order for deactivating the one or more subpassbands, the order progressing from one edge of the user signal passband to an opposite edge; and deactivating the one or more subpassbands according to the determined order.

Clause 43. The method of Clause 41, wherein adjusting the particular ASE passband and the adjacent ASE passband comprises: contracting one of the particular ASE passband and the adjacent ASE passband having a quantity of spectral slices greater than the default quantity by surrendering one or more spectral slices; and expanding one of the particular ASE passband and the adjacent ASE passband having a quantity of spectral slices less than the default quantity to include one or more of the one or more surrendered spectral slices.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element, comprising:

a light source operable to generate an optical signal having a plurality of spectral slices and operable to generate one or more user signal passband on a first set of the plurality of spectral slices, the one or more user signal passband based on user data;

an amplified spontaneous emission (ASE) source configured to generate ASE noise;

a wavelength selective switch operable to receive the ASE noise and the one or more user signal passband, to partition the ASE noise into a plurality of ASE passbands, each ASE passband comprising a default bandwidth bound by an allocated start frequency and an allocated end frequency, the default bandwidth comprising a second set of the plurality of spectral slices, to apply an optical filter to the plurality of ASE passbands, and to combine the plurality of ASE passbands and one or more user signal passband into an output optical signal;

a processor; and a memory comprising a non-transitory processor-readable medium storing processor-executable instructions that when executed by the processor cause the processor to:

cause the light source to generate the one or more user signal passband on the first set of the plurality of spectral slices based on received user data;

for each ASE passband of the plurality of ASE passbands:

mark the passband for deactivation or adjustment when the ASE passband meets one or more of the following, by comparing the first set of the plurality of spectral slices with the second set of the plurality of spectral slices:

mark the ASE passband for deactivation when the second set of the plurality of spectral slices comprises spectral slices entirely contained within the first set;

mark the ASE passband for deactivation when the second set of the plurality of spectral slices comprises spectral slices that are partially contained within the first set of the plurality of spectral sliced and the second set of the plurality of spectral slices includes a count of spectral slices less than a minimum slice threshold;

mark the ASE passband for deactivation when the second set of the plurality of spectral slices does not include at least one of the allocated start frequency and the allocated end frequency;

mark the ASE passband for adjustment when the second set of the plurality of spectral slices comprises spectral slices that are partially contained within the first set, and the second set of the plurality of spectral slices includes a count of spectral slices meets or exceeds a minimum slice threshold; and mark the ASE passband for adjustment when the second set of the plurality of spectral slices comprises spectral slices not contained within the first set of the plurality of spectral slices, and there is no ASE passband disposed between the first set of the plurality of spectral slices and the second set of the plurality of spectral slices;

deactivate the ASE passbands marked for deactivation;

adjust the bandwidth size of the ASE passbands marked for adjustment; and ramp up the one or more user signal passband on the first set of the plurality of spectral slices.

2. The network element of claim 1, wherein the memory further includes instructions that cause the processor to:

adjust the bandwidth size of the ASE passbands marked for adjustment by either:

shrinking the ASE passbands marked for adjustment and having overlap between the first set of the plurality of spectral slices and the second set of the plurality of spectral slices by removing one or more spectral slice from the second set of the plurality of spectral slices that is also contained within the first set of the plurality of spectral slices until the second set of spectral slices is mutually exclusive with the first set of the plurality of spectral slices; and expanding the ASE passbands marked for adjustment and having no overlap between first set of the plurality of spectral slices and the second set of the plurality of spectral slices by including one or more spectral slice within the optical signal between the first set of the plurality of spectral slices and the second set of the plurality of spectral slices in the second set of the plurality of spectral slices.

3. The network element of claim 2, wherein the memory further includes instructions that cause the processor to:

after adjusting the bandwidth size of the ASE passbands marked for adjustment, determine a number of spectral slices in the second set for each of the ASE passbands and mark any ASE passband determined to have the number of spectral slices below the minimum slice threshold for deactivation.

4. The network element of claim 2, wherein the memory further includes instructions that cause the processor to:

simultaneously shrinking the ASE passbands marked for adjustment and having overlap between the first set of the plurality of spectral slices and the second set of the plurality of spectral slices and expanding the ASE passbands marked for adjustment and having no overlap between first set of the plurality of spectral slices and the second set of the plurality of spectral slices.

5. The network element of claim 1, wherein the memory further includes instructions that cause the processor to:

identify an edge slice of an adjacent ASE passband of the plurality of ASE passbands adjacent to the one or more user signal passband; and suppress the edge slice of the adjacent ASE passband.

6. The network element of claim 5, wherein the instruction to suppress the edge slice further includes instructions to cause one or more of:

the wavelength selective switch to attenuate the ASE noise within the edge slice; and the wavelength selective switch to unallocate the edge slice.

7. The network element of claim 1, wherein the memory further includes instructions that cause the processor to:

cause the wavelength selective switch to evenly allocate the default bandwidth to the plurality of ASE passbands within the optical signal; and save the allocated default bandwidth in the memory.

8. The network element of claim 1, wherein the memory further includes instructions that cause the processor to:

determine if the one or more user signal passband can be split into multiple subpassbands, each subpassband comprising a subset of the first set of the plurality of spectral slices;

responsive to determining that the one or more user signal passband can be split into multiple sub-passbands, iteratively perform the marking, deactivating, adjusting, and ramp up instructions, based on the subset of the first set of the plurality of spectral slices, for each subpassband, sequentially.

9. A network element, comprising:

an amplified spontaneous emission (ASE) source configured to generate ASE noise;

a wavelength selective switch operable to receive an optical signal having a plurality of spectral slices and a user signal passband on a first set of the plurality of spectral slices, the user signal passband being based on user data, to receive the ASE noise and the user signal passband, to partition the ASE noise into a plurality of ASE passbands, each ASE passband comprising a default bandwidth bound by an allocated start frequency and an allocated end frequency and a current bandwidth having a current start frequency and a current end frequency, the default bandwidth comprising a second set of the plurality of slices, the second set having a default quantity of spectral slices, to apply an optical filter to the plurality of ASE passbands, and to combine the plurality of ASE passbands and the user signal passband into an output optical signal;

a processor; and a memory comprising a non-transitory processor-readable medium storing processor-executable instructions that when executed by the processor cause the processor to:

deactivate the user signal passband;

responsive to determining if the first set of the plurality of spectral slices includes at least one slice of a particular second set of the plurality of slices associated with a particular ASE passband and has a minimum passband size, load the particular ASE passband onto the first set of the plurality of spectral slices; and responsive to determining that the particular ASE passband includes a first quantity of slices different than the default quantity and an adjacent ASE passband includes a second quantity of slices different than the default quantity, contract the adjacent ASE passband to the default quantity by surrendering one or more spectral slices nearest the particular ASE passband and expand the particular ASE passband to include the one or more surrendered spectral slices.

10. The network element of claim 9, wherein the user signal passband includes at least two subpassbands.

11. The network element of claim 10, wherein the user signal passband has a first edge frequency and a second edge frequency, and wherein the memory further includes instructions that cause the processor to:

determine an order for deactivating the at least two subpassbands, the order progressing from the first edge frequency of the user signal passband to the second edge frequency; and deactivate the one or more subpassbands according to the determined order.

12. The network element of claim 10, wherein the memory further includes instructions that cause the processor to:

after deactivating each subpassband, identify an edge slice within the subset of the deactivated subpassband nearest an adjacent subpassband; and suppress the edge slice of the ASE passband by causing the wavelength selective switch to attenuate the ASE noise within the edge slice.

13. The network element of claim 9, wherein the memory further includes instructions that cause the processor to:

after deactivating the user signal passband, identify any remaining empty spectral slices within the first set of the plurality of spectral slices;

identify one or more unloaded ASE passband to be loaded onto the optical signal, the one or more unloaded ASE passband being one of the plurality of passbands having a current bandwidth of zero and having an overlap between the second set of the plurality of spectral slices and the remaining empty spectral slices; and load each unloaded ASE passband of the one or more unloaded ASE passband onto the remaining empty spectral slices.

14. The network element of claim 13, wherein the memory further includes instructions that cause the processor to:

expand the loaded ASE passband to fill one or more adjacent empty spectral slice within the first set of the plurality of spectral slices.

15. The network element of claim 14, wherein the memory further includes instructions that cause the processor to:

after expanding the loaded ASE passband, evaluate the loaded ASE passband and at least one adjacent ASE passband to determine if either of the loaded ASE passband or the at least one adjacent ASE passband has a respective current bandwidth occupying a respective default bandwidth of the other of the loaded ASE passband or the at least one adjacent ASE passband; and responsive to determining that the respective current bandwidth occupies the respective default bandwidth, adjust the loaded ASE passband and the at least one adjacent ASE passband to have a current end frequency coincide with the allocated end frequency and a current start frequency coincide with the allocated start frequency;

wherein adjusting the loaded ASE passband and the at least one adjacent ASE passband comprises contracting any of the loaded ASE passband and the at least one adjacent ASE passband having a first quantity of spectral slices greater than the default quantity and expanding any of the loaded ASE passband and the at least one adjacent ASE passband having a second quantity of spectral slices less than the default quantity.

16. The network element of claim 9, wherein the instruction to load the particular ASE passband further includes instructions that cause the processor to:

identify a suppressed edge slice of the adjacent ASE passband, the suppressed edge slice being a particular spectral slice within the adjacent ASE passband being suppressed by the wavelength selective switch; and cause the wavelength selective switch to un-suppress the suppressed edge slice.

17. The network element of claim 9, wherein the network element further comprises:

a light source operable to generate the optical signal having the plurality of spectral slices and operable to generate the user signal passband on the first set of the plurality of spectral slices.

18. A method, comprising:

receiving a request to deactivate a user signal passband occupying a first set of spectral slices;

splitting the user signal passband into one or more subpassbands, each subpassband comprising a subset of the first set of spectral slices; and for each subpassband of the one or more subpassbands:

deactivating the subpassband;

responsive to determining the subset of spectral slices includes a spectral slice associated with a default bandwidth of a particular amplified spontaneous emission (ASE) passband, loading the particular ASE passband onto the subset of spectral slices; and responsive to determining that the particular ASE passband and an adjacent ASE passband have overlapping current bandwidths, adjusting the particular ASE passband and the adjacent ASE passband to restore a boundary frequency between the particular ASE passband and the adjacent ASE passband to one of an allocated start frequency and an allocated end frequency, the boundary frequency being a boundary between the default bandwidth of the particular ASE passband and a default bandwidth of the adjacent ASE passband.

19. The method of claim 18, further comprising:

determining an order for deactivating the one or more subpassbands, the order progressing from one edge of the user signal passband to an opposite edge; and deactivating the one or more subpassbands according to the determined order.

20. The method of claim 18, wherein adjusting the particular ASE passband and the adjacent ASE passband comprises:

contracting one of the particular ASE passband and the adjacent ASE passband having a quantity of spectral slices greater than the default quantity by surrendering one or more spectral slices; and expanding one of the particular ASE passband and the adjacent ASE passband having a quantity of spectral slices less than the default quantity to include one or more of the one or more surrendered spectral slices.

* * * * *